(12) United States Patent
Eum et al.

(10) Patent No.: US 10,104,312 B2
(45) Date of Patent: Oct. 16, 2018

(54) MOBILE TERMINAL AND METHOD FOR CONTROLLING THE SAME

(71) Applicant: LG ELECTRONICS INC., Seoul (KR)

(72) Inventors: Hyomin Eum, Seoul (KR); Younghoon Song, Seoul (KR); Seongeun Kim, Seoul (KR); Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/283,586

(22) Filed: Oct. 3, 2016

(65) Prior Publication Data
US 2017/0289462 A1 Oct. 5, 2017

(30) Foreign Application Priority Data
Mar. 31, 2016 (KR) ........................ 10-2016-0039588

(51) Int. Cl.
| | |
|---|---|
| H04N 5/265 | (2006.01) |
| H04N 5/225 | (2006.01) |
| H04N 5/232 | (2006.01) |
| H04N 5/262 | (2006.01) |
| G06T 11/60 | (2006.01) |
| H04N 5/272 | (2006.01) |
| H04N 5/28 | (2006.01) |

(52) U.S. Cl.
CPC ............ *H04N 5/265* (2013.01); *G06T 11/60* (2013.01); *H04N 5/2258* (2013.01); *H04N 5/23245* (2013.01); *H04N 5/23293* (2013.01); *H04N 5/2621* (2013.01); *H04N 5/2628* (2013.01); *H04N 5/272* (2013.01); *H04N 5/28* (2013.01); *G06T 2207/10004* (2013.01); *G06T 2207/10016* (2013.01); *G06T 2207/20221* (2013.01); *G06T 2210/62* (2013.01); *H04M 2250/52* (2013.01)

(58) Field of Classification Search
None
See application file for complete search history.

(56) References Cited

U.S. PATENT DOCUMENTS

| | | |
|---|---|---|
| 2010/0321533 A1 | 12/2010 | Park et al. |
| 2012/0176503 A1 | 7/2012 | You |
| 2012/0274808 A1* | 11/2012 | Chong ............... H04N 5/23293 348/234 |
| 2013/0083151 A1* | 4/2013 | Kim ................... H04L 65/1069 348/14.07 |
| 2013/0235224 A1 | 9/2013 | Park et al. |
| 2014/0253693 A1 | 9/2014 | Shikata |

FOREIGN PATENT DOCUMENTS

EP 2887641 A1 6/2015

* cited by examiner

*Primary Examiner* — James Hannett
(74) *Attorney, Agent, or Firm* — Birch, Stewart, Kolasch & Birch, LLP

(57) ABSTRACT

A mobile terminal including a wireless communication processor configured to provide wireless communication; a display; a first camera configured to capture a still image and a second camera configured to capture a video image at overlapping capturing times in a preset simultaneous shooting mode; and a controller configured to in response to a preset user input, generate a composite image including the still image captured by the first camera and the video image captured by the second camera, and display the composite image on the display.

18 Claims, 29 Drawing Sheets

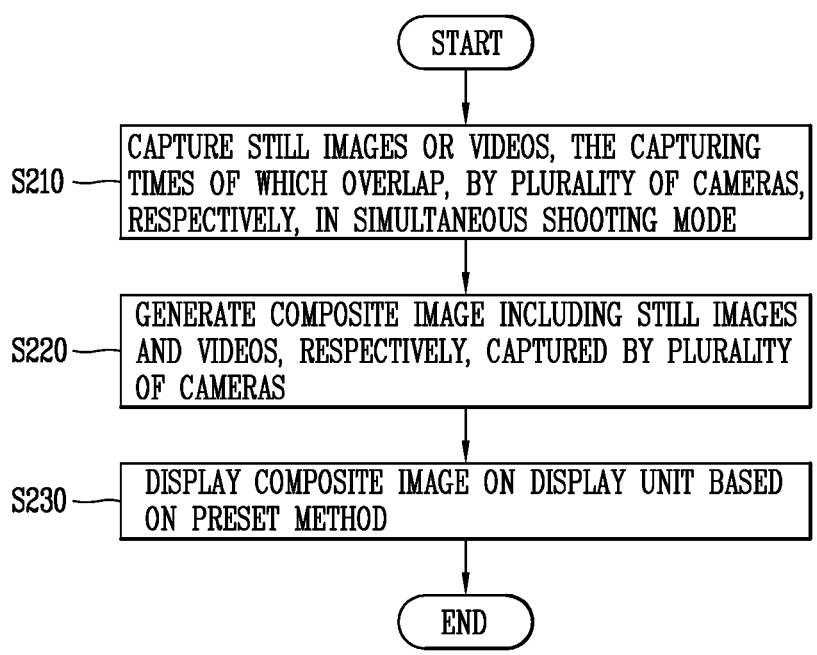

FIG. 7
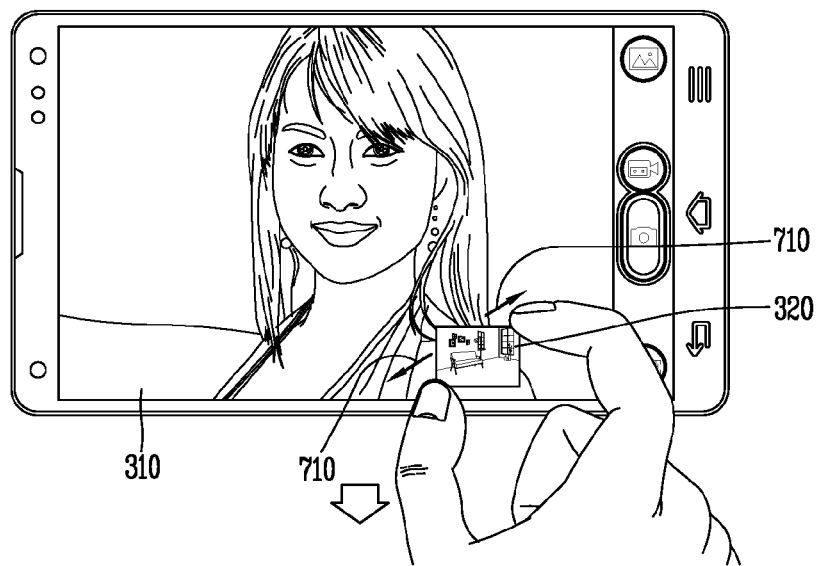
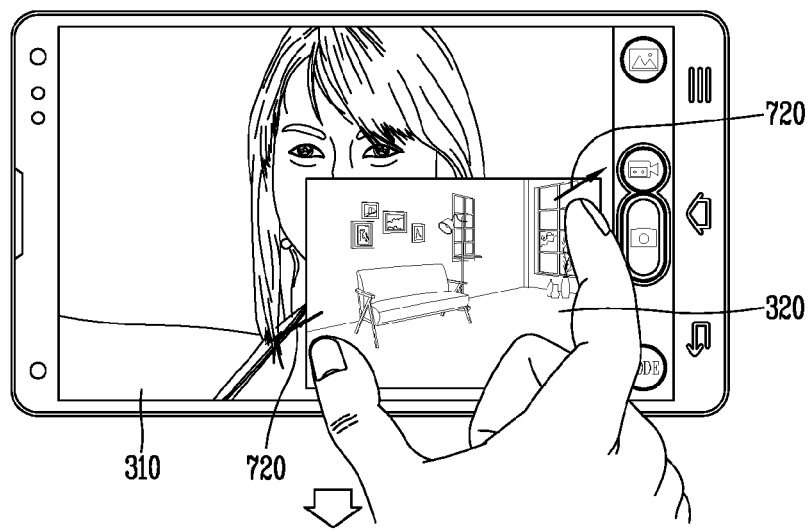
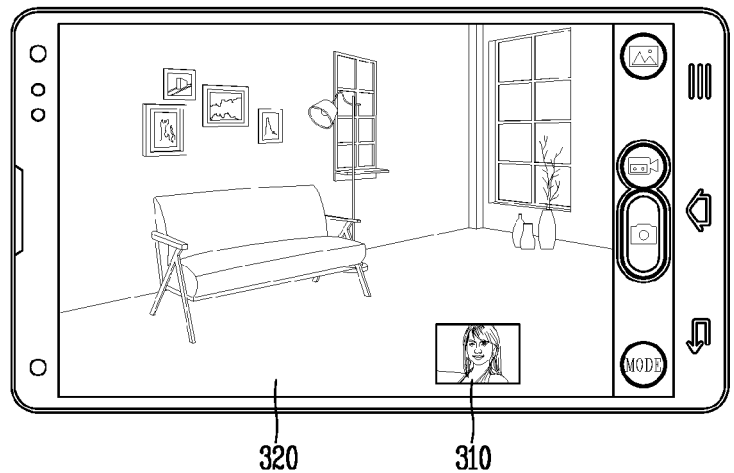

FIG. 27
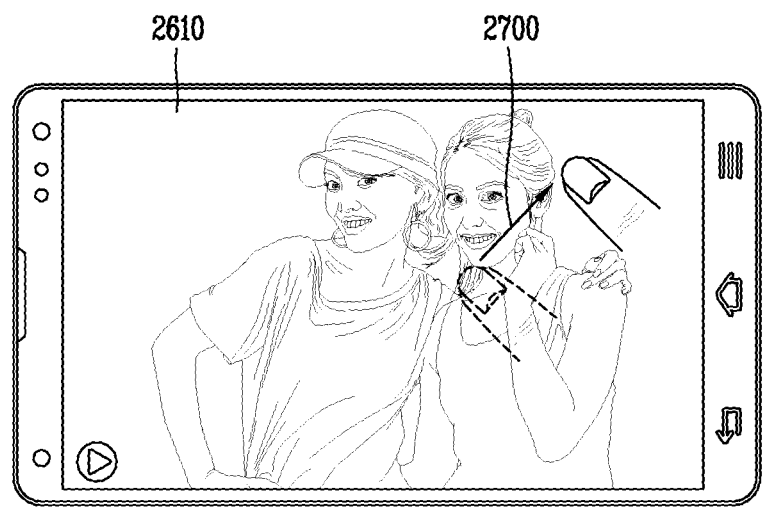
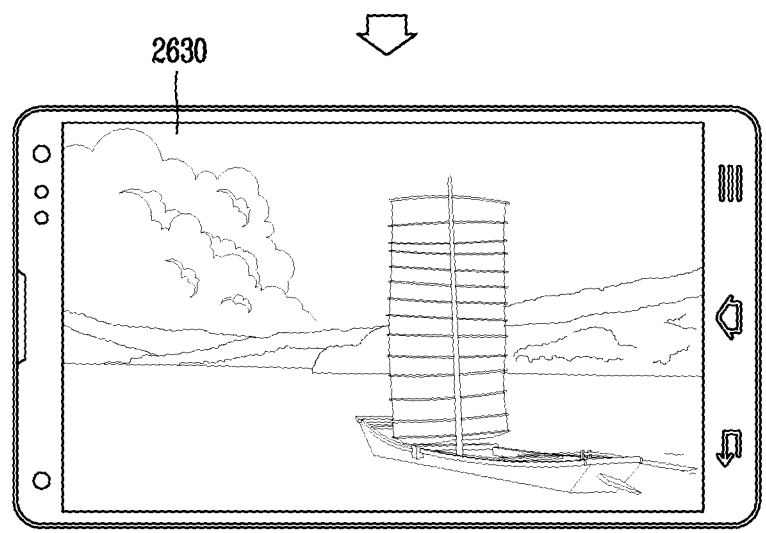

MOBILE TERMINAL AND METHOD FOR CONTROLLING THE SAME

CROSS-REFERENCE TO RELATED APPLICATION

This application claims the benefit of priority of Korean Patent Application No. 10-2016-0039588, filed on Mar. 31, 2016, which is herein expressly incorporated by reference in their entireties.

BACKGROUND OF THE INVENTION

1. Field of the Invention

The present disclosure relates to a mobile terminal having a plurality of cameras, and a control method thereof.

2. Description of the Related Art

Terminals can be generally classified into mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can capture still images or moving images, play music or video files, play games, receive broadcast and the like, so as to be implemented as an integrated multimedia player. In particular, a capture function in a mobile terminal has emerged as a main function rather than an ancillary function, and the importance has increased.

In the past, a camera of a mobile terminal has emphasized features such as a number of pixels, a self camera correction function or the like, but in recent years, it supports photographing comparable to a DSLR camera in various aspects such as auto focus (AF), wide angle or the like. Due to such a trend, efforts for capturing current situation in various fields of view in a more real sense have continued. In other words, the need for techniques capable of expressing current situation in a collective manner has increased.

SUMMARY OF THE INVENTION

An object of the present disclosure is to solve the foregoing problems and other problems.

Another object of the present disclosure is to provide a mobile terminal capable of capturing a still image and a video at the same time with a plurality of cameras, and generating one composite image including the captured still image and video.

In order to accomplish the above and other objectives, according to an aspect of the present disclosure, there is provided a mobile terminal including a plurality of cameras configured to capture a still image and a video, respectively, the capturing times of which overlap with each other, in a preset simultaneous shooting mode; a controller configured to generate a composite image including the still image and video, respectively, captured by the plurality of cameras; and a display unit configured to display the composite image in a preset manner, wherein the controller generates a composite image including a still image captured by at least one of the plurality of cameras and a video captured by at least another camera based on the application of a preset user input in the simultaneous shooting mode.

Furthermore, according to another aspect of the present disclosure, there is provided a control method of a mobile terminal, and the method may include (a) capturing a still image and a video, respectively, the capturing times of which overlap with each other, by a plurality of cameras in a preset simultaneous shooting mode; (b) generating a composite image including the still image and video, respectively, captured by the plurality of cameras; and (c) displaying the composite image in a preset manner on a display unit, wherein said (b) step generates a composite image including a still image captured by at least one of the plurality of cameras and a video captured by at least another camera based on the application of a preset user input in the simultaneous shooting mode.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flow chart illustrating a control method of a mobile terminal according to the present disclosure;

FIGS. 5 through 7 are conceptual views illustrating another embodiment in which a preview image is displayed in a flip photo mode;

FIGS. 26 through 28 are conceptual views illustrating an embodiment in which a composite image consisting of a plurality of videos is played back.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it can be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
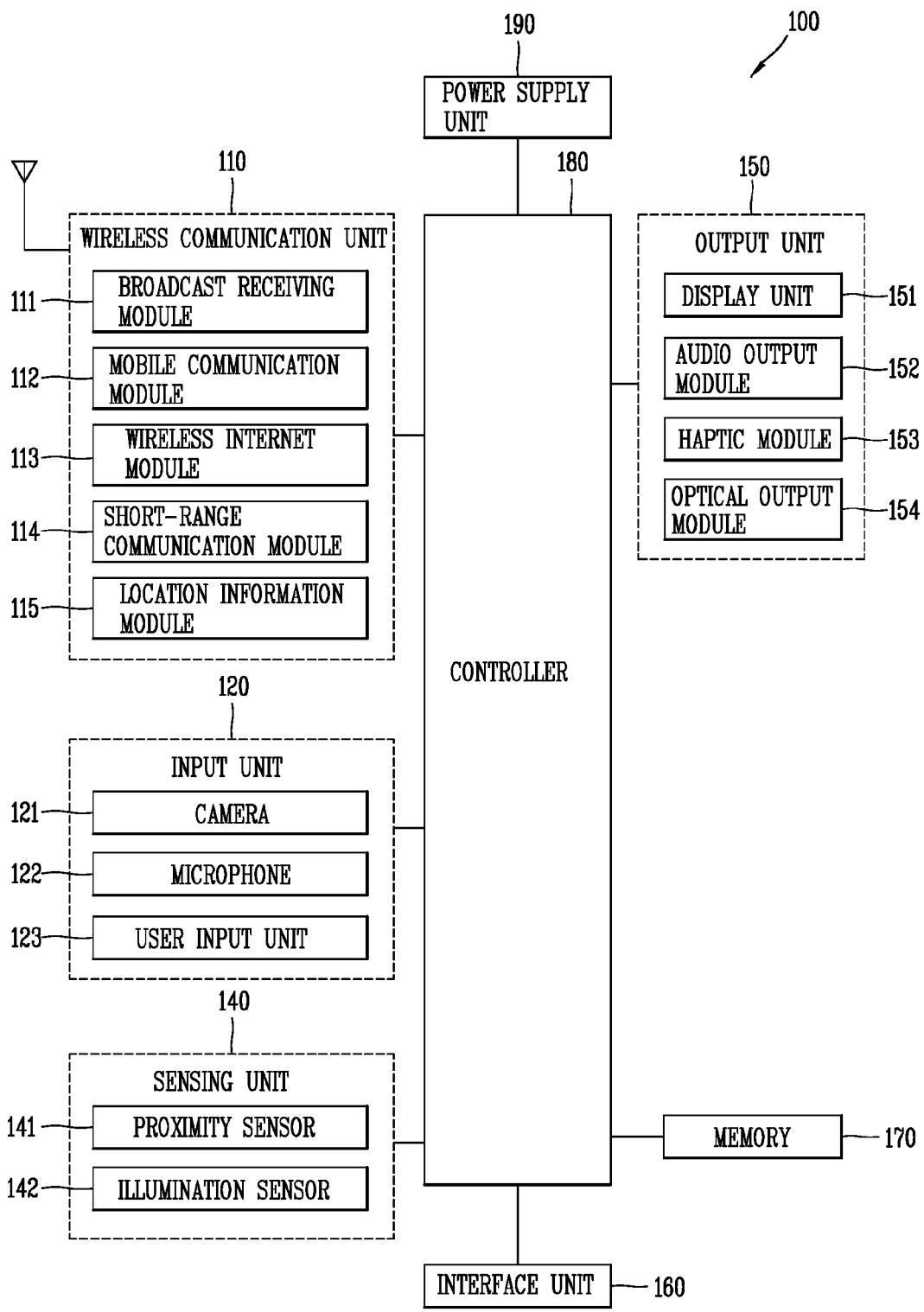
FIG. 1A is a block diagram illustrating a mobile terminal associated with the present disclosure.
Figure 1B:
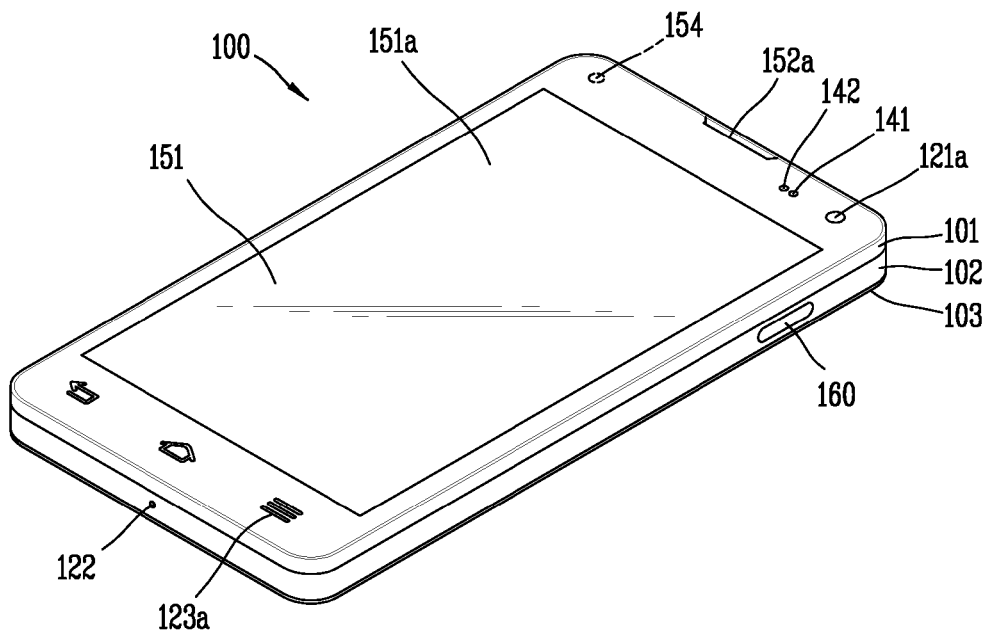
FIGS. 1B and 1C are conceptual views illustrating an example in which a mobile terminal associated with the present disclosure is seen from different directions.
Figure 1C:
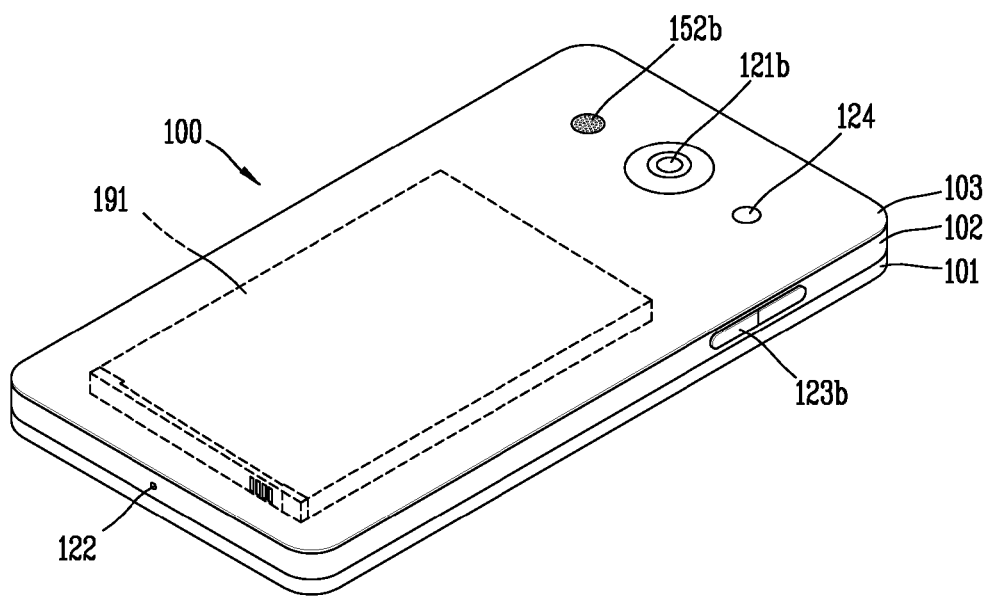

Referring to FIGS. 1A through 1C, FIG. 1A is a block diagram of a mobile terminal in accordance with the present disclosure, and FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like. The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 can be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 can output an audio signal, a video signal or a tactile signal. The output unit 150 may include a display unit 151, an audio output module 152, a haptic module 153, an optical output module 154 and the like. The display unit 151 can have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 can store a plurality of application programs (or applications) executed in the mobile terminal 100, data for operations of the mobile terminal 100, instruction words, and the like. At least some of those application programs can be downloaded from an external server via wireless communication. Some others of those application programs can be installed within the mobile terminal 100 at the time of being shipped for basic functions of the mobile terminal 100 (for example, receiving a call, placing a call, receiving a message, sending a message, etc.). Further, the application programs can be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery can be an embedded battery or a replaceable battery.

At least part of those elements and components can be combined to implement operation and control of the mobile terminal or a control method of the mobile terminal according to various exemplary embodiments described herein. Also, the operation and control or the control method of the mobile terminal can be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 can be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages. The wireless Internet module 113 denotes a module for wireless Internet access. This module can be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to WiBro, HSDPA, GSM, CDMA, WCDMA, LTE, LTE-A and the like are executed via a mobile communication network, the wireless Internet module 113 which performs the wireless Internet access via the mobile communication network can be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 can be a wearable device, for example, a smart watch, a smart glass or a head mounted display (HMD), which can exchange data with the mobile terminal 100 (or to cooperate with the mobile terminal 100). The short-range communication module 114 can sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal can be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 can provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames can be displayed on the display unit 151. Further, the plurality of cameras 121 disposed in the mobile terminal 100 can be arranged in a matrix configuration. By use of the cameras 121 having the matrix configuration, a plurality of image information having various angles or focal points can be input into the mobile terminal 100. Also, the plurality of cameras 121 can be arranged in a stereoscopic structure to acquire a left image and a right image for implementing a stereoscopic image.

The microphone 122 may process an external audio signal into electric audio data. The processed audio data can be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means can be a virtual key, a soft key or a visual key, which is displayed on a touch screen through software processing, or a touch key which is disposed on a portion except for the touch screen. Further, the virtual key or the visual key can be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which can be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 can be arranged at an inner region of the mobile terminal covered by the touch screen, or near the touch screen. The proximity sensor 141 has a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 can sense proximity of a pointer to the touch screen by changes of an electromagnetic field, which is responsive to an approach of an object with conductivity. In this instance, the touch screen (touch sensor) can be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 can sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor can sense a touch (or touch input) applied onto the touch screen (or the display unit 151) using at least one of various types of touch methods, such as a resistive type, a capacitive type, an infrared type, a magnetic field type, and the like. As one example, the touch sensor can convert changes of pressure applied to a specific part of the display unit 151 or a capacitance occurring from a specific part of the display unit 151, into electric input signals. Also, the touch sensor can sense not only a touched position and a touched area, but also touch pressure. Here, a touch object is an object to apply a touch input onto the touch sensor. Examples of the touch object include a finger, a touch pen, a stylus pen, a pointer or the like.

When touch inputs are sensed by the touch sensors, corresponding signals can be transmitted to a touch controller. The touch controller cancan process the received signals, and then transmit corresponding data to the controller 180. Accordingly, the controller 180 can sense which region of the display unit 151 has been touched. Here, the touch controller can be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input can be decided based on a current operating state of the mobile terminal 100 or a currently executed application program.

Further, the touch sensor can be formed to sense a touch input using a different scheme in an active or inactive state of the display unit 151. At this time, the different scheme can be associated with an active period of the touch sensor. More specifically, the touch sensor can be activated with a different period according to whether or not the display unit 151 is activated. In other words, the touch sensor can have a different active period according to whether or not the display unit 151 is activated to sense a touch input applied to the touch sensor.

For example, when the display unit 151 is in an inactive state, the touch sensor can be activated with a preset specific period. In this instance, the specific period can be a period corresponding to a time greater than zero. Furthermore, when the display unit 151 is in an active state, the touch sensor can be always operated in an active state. In other words, in this instance, an activated period of the touch sensor can be a period having a time zero or very close to zero.

Whether or not the touch sensor is activated can be determined using the power consumption of the touch sensor. For example, the touch sensor may correspond to an inactive state when the power consumption of the touch sensor is less than a preset reference value based on zero, and can be referred to as an active state when the power consumption of the touch sensor is greater than a preset reference value based on zero.

When the display unit 151 is in an active state (hereinafter, referred to as an "active mode"), the touch sensor may continuously maintain the active state, and wait form the application of a touch input to the display unit 151. On the contrary, when the display unit 151 is in an inactive state (hereinafter, referred to as a "doze mode"), the touch sensor can be activated for each a preset specific period.

Further, as reducing a specific period in which the touch sensor is activated, a speed for sensing a touch input hitting the display unit 151 can increase, but accordingly power consumed by the touch sensor may also increase. On the contrary, as increasing the period in which the touch sensor is activated, a speed for sensing a touch input hitting the display unit 151 can decrease though power consumed by the touch sensor decreases.

Accordingly, the specific period can be set to enhance the efficiency of power consumption while the sensing speed is fast enough to the extent that cannot be recognized by the user in sensing a touch input hitting the display unit 151. For example, the specific period can be set such that the touch sensor is inactive and then active 20 times (Hz) per second.

Further, while the display unit 151 is in an active state, the touch sensor can be also activated, and the active period (T) in an active state can be zero or very close to zero. Otherwise, the period of the touch sensor while the touch sensor is in an active state can be shorter several times than a specific period set to activate the touch sensor while the display unit 151 is in an inactive state.

Further, when a preset touch input (for example, a first and a second touch input consecutively hitting a predetermined region within a reference period of time) is sensed by the touch sensor in a doze mode in which the display unit 151 is deactivated and the touch sensor is periodically activated, the controller 180 can switch the doze mode to an active mode in which the display unit and touch sensor are activated.

In addition, the touch sensor can be driven with a different period based on the state of the display unit 151. For example, the touch sensor may execute a doze mode when the display unit 151 is in a closed state, and execute an active mode when switching from the closed state to an open state.

Meanwhile, the touch sensor and the proximity sensor can be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor can recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor can be much shorter than a time for which the ultrasonic wave reaches the ultrasonic sensor. The position of the wave generation source can be calculated using the fact. In more detail, the position of the wave generation source can be calculated by using a time difference from the time that the ultrasonic wave reaches based on the light as a reference signal.

The camera 121 constructing the input unit 120 can be a type of camera sensor. The camera sensor may include at least one of a photo sensor (or image sensor) and a laser sensor. The camera 121 and the laser sensor can be combined to detect a touch of the sensing object with respect to a 3D stereoscopic image. The photo sensor can be laminated on the display device. The photo sensor can scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor can calculate the coordinates of the sensing object according to variation of light to thus obtain position information of the sensing object.

The display unit 151 can output information processed in the mobile terminal 100. For example, the display unit 151 can display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit 152 can employ a stereoscopic display scheme such as stereoscopic scheme (a glass scheme), an auto-stereoscopic scheme (glassless scheme), a projection scheme (holographic scheme), or the like.

The audio output module 152 can output audio data received from the wireless communication unit 110 or stored in the memory 160 in a call signal reception mode, a call mode, a record mode, a voice recognition mode, a broadcast reception mode, and the like. Also, the audio output module 152 can also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 can generate various tactile effects the that user can feel. A typical example of the tactile effect generated by the haptic module 153 can be vibration. Strength, pattern and the like of the vibration generated by the haptic module 153 can be controllable by a user selection or setting of the controller. For example, the haptic module 153 can output different vibrations in a combining manner or a sequential manner.

Besides vibration, the haptic module 153 can generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 can be implemented to allow the user to feel a tactile effect through a muscle sensation such as the user's fingers or arm, as well as transferring the tactile effect through a direct contact. Two or more haptic modules 153 can be provided according to the configuration of the mobile terminal 100.

An optical output module 154 can output a signal for indicating an event generation using light of a light source. Examples of events generated in the mobile terminal 100 include a message reception, a call signal reception, a missed call, an alarm, a schedule notice, an email reception, an information reception through an application, and the like.

A signal output by the optical output module 154 can be implemented so the mobile terminal emits monochromatic light or light with a plurality of colors. The signal output can be terminated as the mobile terminal senses a user's event checking.

The interface unit 160 serves as an interface with every external device connected with the mobile terminal 100. For example, the interface unit 160 can receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module can be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device can be connected with the terminal 100 via the interface unit 160.

When the mobile terminal 100 is connected with an external cradle, the interface unit 160 serves as a passage to allow power from the cradle to be supplied to the mobile terminal 100 therethrough or serves as a passage to allow various command signals input by the user from the cradle to be transferred to the mobile terminal therethrough. Various command signals or power input from the cradle can operate as signals for recognizing that the mobile terminal is properly mounted on the cradle.

The memory 170 can store programs for operations of the controller 180 and temporarily store input/output data (for example, phonebook, messages, still images, videos, etc.). The memory 170 can store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 can be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 can receive external power or internal power and supply appropriate power required for operating respective elements and components included in the mobile terminal 100 under the control of the controller 180. The power supply unit 190 may include a battery. The battery can be an embedded battery which is rechargeable or be detachably coupled to the terminal body for charging.

The power supply unit 190 may include a connection port. The connection port can be configured as one example of the interface unit 160 to which an external (re)charger for supplying power to recharge the battery is electrically connected. As another example, the power supply unit 190 can recharge the battery in a wireless manner without use of the connection port. Here, the power supply unit 190 can receive power, transferred from an external wireless power transmitter, using at least one of an inductive coupling method which is based on magnetic induction or a magnetic resonance coupling method which is based on electromagnetic resonance. Various embodiments described herein can be implemented in a computer-readable or its similar medium using, for example, software, hardware, or any combination thereof.

Referring to FIGS. 1B and 1C, the mobile terminal 100 disclosed herein can be provided with a bar-type terminal body. However, the present disclosure is not limited to this, but also can be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

The mobile terminal 100 may include a case (casing, housing, cover, etc.) forming the appearance of the terminal. In this embodiment, the case can be divided into a front case 101 and a rear case 102. Various electronic components can be incorporated into a space formed between the front case 101 and the rear case 102. At least one middle case can be additionally disposed between the front case 101 and the rear case 102

A display unit 151 can be disposed on a front surface of the terminal body to output information. As illustrated, a window 151*a* of the display unit 151 can be mounted to the front case 101 so as to form the front surface of the terminal body together with the front case 101.

In some cases, electronic components may also be mounted to the rear case 102. Examples of those electronic components mounted to the rear case 102 include a detachable battery, an identification module, a memory card and the like. Here, a rear cover 103 for covering the electronic components mounted can be detachably coupled to the rear case 102. Therefore, when the rear cover 103 is detached from the rear case 102, the electronic components mounted to the rear case 102 can be externally exposed.

As illustrated, when the rear cover 103 is coupled to the rear case 102, a side surface of the rear case 102 is partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 can be formed by injection-molding synthetic resin or can be formed of a metal, for example, stainless steel (STS), titanium (Ti), or the like. Unlike the example which the plurality of cases form an inner space for accommodating such various components, the mobile terminal 100 can be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of a mobile terminal 100 in which the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components are not limited to the arrangement, but can be excluded or arranged on another surface if necessary. For example, the first manipulation unit 123a may not be disposed on the front surface of the terminal body, and the second audio output module 152b can be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 can be implemented in two or more in number according to a configured aspect of the mobile terminal 100. For instance, a plurality of the display units 151 can be arranged on one surface to be spaced apart from or integrated with each other, or can be arranged on different surfaces.

The display unit 151 can include a touch sensor which senses a touch onto the display unit so as to receive a control command in a touching manner. When a touch is input to the display unit 151, the touch sensor can sense this touch and the controller 180 can generate a control command corresponding to the touch. The content which is input in the touching manner can be a text or numerical value, or a menu item which can be indicated or designated in various modes.

The touch sensor can be configured in a form of film having a touch pattern. The touch sensor can be a metal wire, which is disposed between the window 151a and a display on a rear surface of the window 151a or patterned directly on the rear surface of the window 151a. Or, the touch sensor can be integrally formed with the display. For example, the touch sensor can be disposed on a substrate of the display or within the display.

The display unit 151 may form a touch screen together with the touch sensor. Here, the touch screen serves as the user input unit 123 (see FIG. 1A). Therefore, the touch screen may replace at least some of functions of the first manipulation unit 123a. The first audio output module 152a can be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure is not limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller can control the optical output unit 154 to stop the output of the light.

The first camera 121a can process video frames such as still or moving images obtained by the image sensor in a video call mode or a capture mode. The processed video frames can be displayed on the display unit 151 or stored in the memory 170.

The first and second manipulation units 123a and 123b are examples of the user input unit 123, which can be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure is not limited to this. For example, the first manipulation unit 123a can be configured with a mechanical key, or a combination of a touch key and a push key.

The content received by the first and second manipulation units 123a and 123b can be set in various ways. For example, the first manipulation unit 123a can be used by the user to input a command such as menu, home key, cancel, search, or the like, and the second manipulation unit 123b can be used by the user to input a command, such as controlling a volume level being output from the first or second audio output module 152a or 152b, switching into a touch recognition mode of the display unit 151, or the like.

Further, as another example of the user input unit 123, a rear input unit can be disposed on the rear surface of the terminal body. The rear input unit can be manipulated by a user to input a command for controlling an operation of the mobile terminal 100. The content input can be set in various ways. For example, the rear input unit can be used by the user to input a command, such as power on/off, start, end, scroll or the like, controlling a volume level being output from the first or second audio output module 152a or 152b, switching into a touch recognition mode of the display unit 151, or the like. The rear input unit can be implemented into a form allowing a touch input, a push input or a combination thereof.

The rear input unit can be disposed to overlap the display unit 151 of the front surface in a thickness direction of the terminal body. As one example, the rear input unit can be disposed on an upper end portion of the rear surface of the terminal body such that a user can easily manipulate it using a forefinger when the user grabs the terminal body with one hand. However, the present disclosure is not limited to this, and the position of the rear input unit can be changeable.

When the rear input unit is disposed on the rear surface of the terminal body, a new user interface can be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 can be implemented to have a larger screen.

Further, the mobile terminal 100 may include a finger scan sensor which scans a user's fingerprint. The controller can use fingerprint information sensed by the finger scan sensor as an authentication mechanism. The finger scan sensor can be installed in the display unit 151 or the user input unit 123.

The microphone 122 can be formed to receive the user's voice, other sounds, and the like. The microphone 122 can be provided at a plurality of places, and configured to receive stereo sounds.

The interface unit 160 serves as a path allowing the mobile terminal 100 to exchange data with external devices. For example, the interface unit 160 can be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 can be implemented in the form of a socket for accommodating an external card, such as Subscriber Identification Module (SIM), User Identity Module (UIM), or a memory card for information storage.

The second camera 121b can be further mounted to the rear surface of the terminal body. The second camera 121b can have an image capturing direction, which is substantially opposite to the direction of the first camera unit 121a. The second camera 121b may include a plurality of lenses arranged along at least one line. The plurality of lenses may also be arranged in a matrix configuration. The cameras can be referred to as an 'array camera.' When the second camera 121b is implemented as the array camera, images can be captured in various manners using the plurality of lenses and images with better qualities can be obtained.

A flash 124 can be disposed adjacent to the second camera 121b. When an image of a subject is captured with the camera 121b, the flash 124 may illuminate the subject. The second audio output module 152b may further be disposed on the terminal body. The second audio output module 152b can implement stereophonic sound functions in conjunction with the first audio output module 152a (refer to FIG. 1A), and can be also used for implementing a speaker phone mode for call communication.

At least one antenna for wireless communication can be disposed on the terminal body. The antenna can be installed in the terminal body or formed on the case. For example, an antenna which configures a part of the broadcast receiving module 111 (see FIG. 1A) can be retractable into the terminal body. Alternatively, an antenna can be formed in a form of film to be attached onto an inner surface of the rear cover 103 or a case including a conductive material serves as an antenna.

A power supply unit 190 (refer to FIG. 1A) for supplying power to the mobile terminal 100 can be disposed on the terminal body. The power supply unit 190 may include a batter 191 which is mounted in the terminal body or detachably coupled to an outside of the terminal body.

The battery 191 can receive power via a power source cable connected to the interface unit 160. Also, the battery 191 can be (re)chargeable in a wireless manner using a wireless charger. The wireless charging can be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 can be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 can be provided. The cover or pouch may cooperate with the display unit 151 to extend the function of the mobile terminal 100. Another example of the accessory can be a touch pen for assisting or extending a touch input onto a touch screen.

Hereinafter, preferred embodiments related to a control method which can be implemented in the mobile terminal will be explained in more detail with reference to the attached drawings. It is obvious to those skilled in the art that the present features can be embodied in several forms without departing from the characteristics thereof.

FIG. 2 is a flow chart illustrating a control method of a mobile terminal according to the present disclosure. Referring to FIG. 2, the process (S210) of capturing a still image and a video, respectively, the capturing times of which overlap with each other, by a plurality of cameras in a preset simultaneous shooting mode is performed.

The simultaneous shooting mode can be defined as a mode in which images or videos are captured by a plurality of cameras in a partially or entirely overlapping manner in the capturing times thereof. For example, video capturing by the rear camera 121b can be started while at the same time capturing a still image by the front camera 121a.

Subsequently, the process (S220) of generating a composite image including the still image and video, respectively, captured by the plurality of cameras is performed. A composite image can be defined as an image in which a plurality of still images or videos, the capturing times of which partially or entirely overlap, can be consecutively displayed.

Thus, the composite image can have a file format including a plurality of images. Alternatively, when a predetermined period of time has passed or a user applies a specific input, the composite image can have a format in which a plurality of images captured in an overlapping manner in the capturing times are consecutively displayed. For an example, a plurality of images can be consecutively connected based on whether image capturing time points overlap or not.

For a specific embodiment associated therewith, when a predetermined period of time has passed or a user applies a specific input while displaying a photo captured by the front camera 121a, a video captured by the rear camera 121b can be displayed.

Accordingly, the effect of feeling that a photo is attached to a front surface of both images, and a video is attached to a rear surface thereof can be generated. Then, the process (S230) of displaying the composite image in a preset manner on the display unit 151 is performed.

In one embodiment, the composite images can be stored and displayed in a separate folder within a photo album. Alternatively, the composite images can be stored and displayed in a temporary storage folder until the completion of capturing.

In another embodiment, a still image included in the composite image can be first displayed. Then, when a drag input or the like is applied, a video included in the composite image can be played back. Here, the step S220 may include generating a composite image including a still image captured by at least one of the plurality of cameras and a video captured by at least another camera based on the application of a preset user input in the simultaneous shooting mode.

Figure 3:
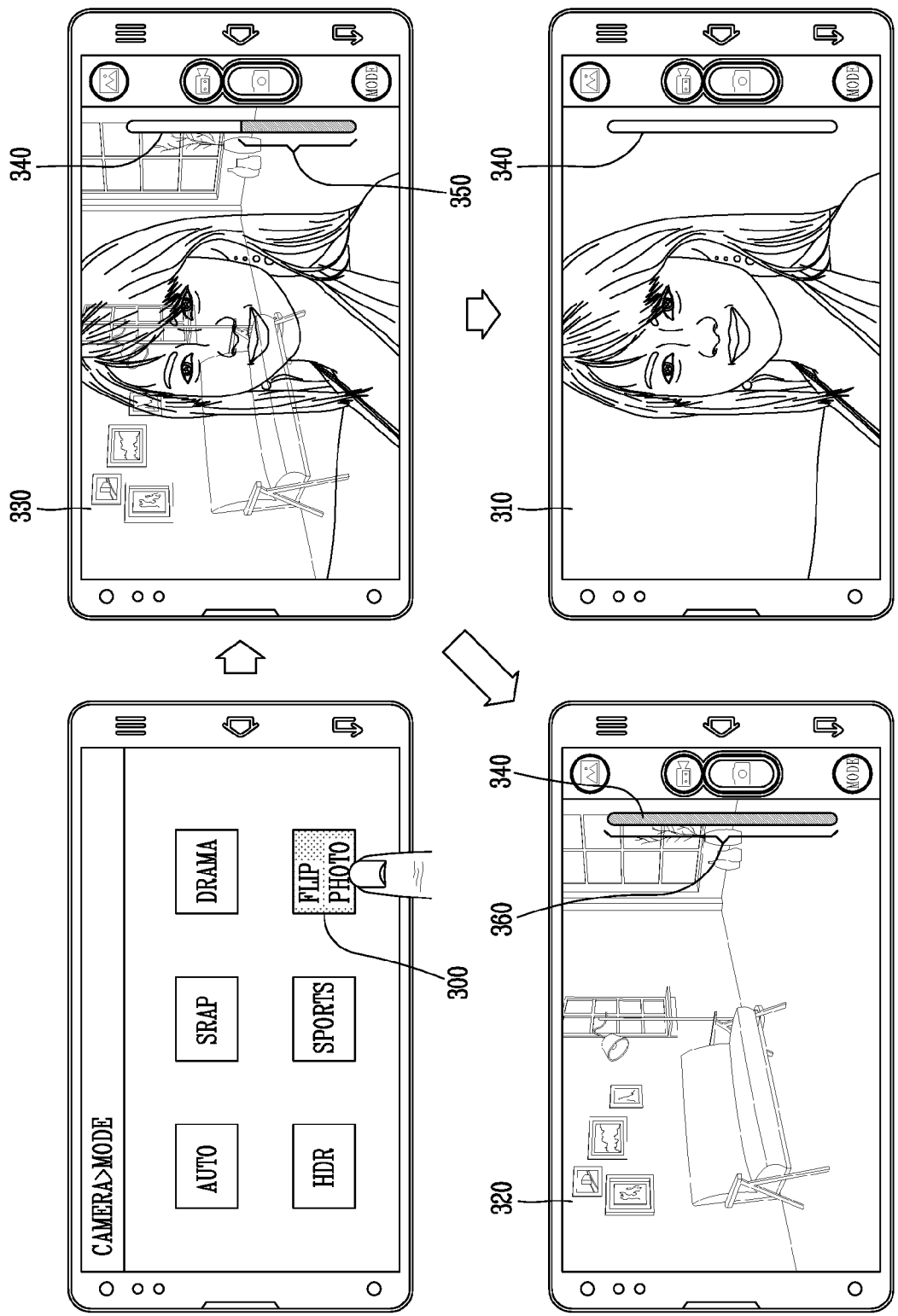
FIG. 3 is a conceptual view illustrating an embodiment in which a preview image is displayed in a flip photo mode.

Hereinafter, a specific embodiment thereof will be described with reference to a drawing. In particular, FIG. 3 is a conceptual view illustrating an embodiment in which a preview image is displayed in a flip photo mode. Referring to FIG. 3, when a touch input is applied to an icon 300 corresponding to a simultaneous shooting mode (flip photo mode) in a camera environment setting mode, the mobile terminal enters a flip photo mode.

Subsequently, a preview image 330 in which a first preview image 310 by a first camera overlaps with a second preview image 320 by a second camera can be displayed for a predetermined period of time. In one embodiment, the preview image 310 by the front camera 121a and the preview image 320 by the rear camera 121b can be displayed in an overlapping manner for a short period of time.

Here, a transparency setting bar 340 for displaying or being set to the transparency of a preview image can be displayed. Specifically, a gauge value 350 of 50% can be displayed on the transparency setting bar 340 while displaying the overlapping preview image 330. Thus, after the overlapping preview image 330 is displayed for a predetermined period of time, only a preview image by a camera set to an initial value (default value) can be displayed.

In one embodiment, after the overlapping preview image 330 is displayed for a predetermined period of time, only the preview image 310 by the front camera 121a can be displayed. Here, a gauge value (0%) is not displayed on the transparency setting bar 340.

In another embodiment, after the overlapping preview image 330 is displayed for a predetermined period of time, only the preview image 320 by the rear camera 121b can be displayed. Here, a gauge value 360 of 100% may not be displayed on the transparency setting bar 340.

In other words, according to the embodiment of FIG. 3, when entering a flip photo mode, a preview image 330 by the front camera 121a and rear camera 121b can be displayed in an overlapping manner. Then, only a preview image (310 or 320) by the front camera 121a or rear camera 121b can be displayed, and the transparency setting bar 340 indicating the transparency of a preview image being displayed can be displayed at the same time.

Figure 4:
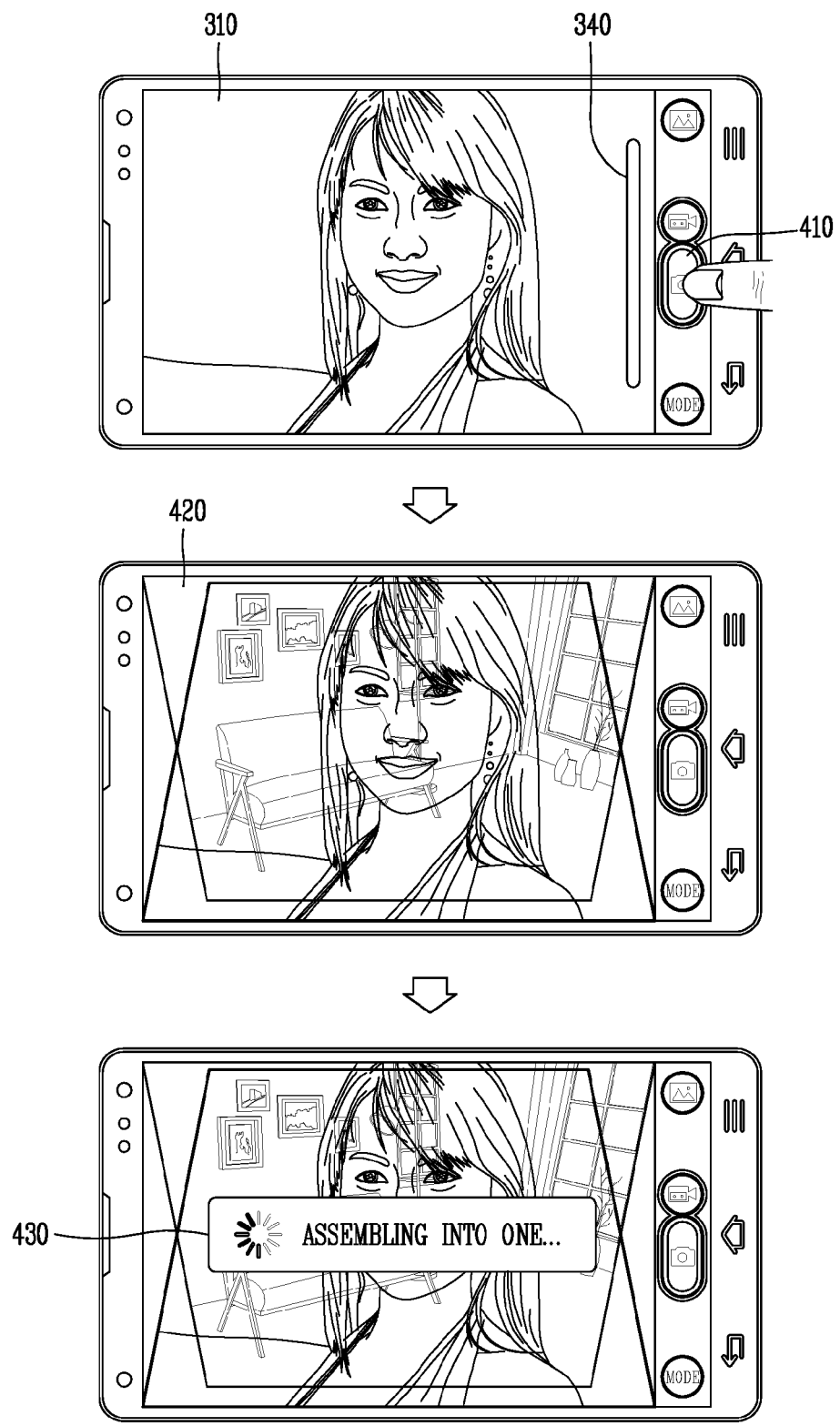
FIG. 4 is a conceptual view illustrating an embodiment in which a composite image is generated in a flip photo mode.

Next, FIG. 4 is a conceptual view illustrating an embodiment in which a composite image is generated in a flip photo mode. Referring to FIG. 4, only the preview image 310 by the front camera 121a can be displayed. Here, a gauge value (0%) is not displayed on the transparency setting bar 340.

Subsequently, when a touch input is applied to a capture button 410, the front camera 121a and rear camera 121b capture images respectively at the same time. Specifically, the front camera 121a and rear camera 121b can capture the images 310, 320 which are seen as previews, respectively, at the same time.

In one embodiment, an animation effect or the like 420 in which the image 310 captured by the front camera 121a and the image 320 captured by the rear camera 121b are three-dimensionally viewed in an overlapping manner can be displayed. Then, one composite image including images captured by the front camera 121a and rear camera 121b, respectively, can be generated. In one embodiment, while generating a composite image, a message popup window 430 indicating this can be displayed.

The controller 180 can display a plurality of preview images by the plurality of cameras in an overlapping manner on the display unit 151. Furthermore, the controller 180 can display an object for setting the transparency of the plurality of preview images on the display unit 151.

Figure 5:
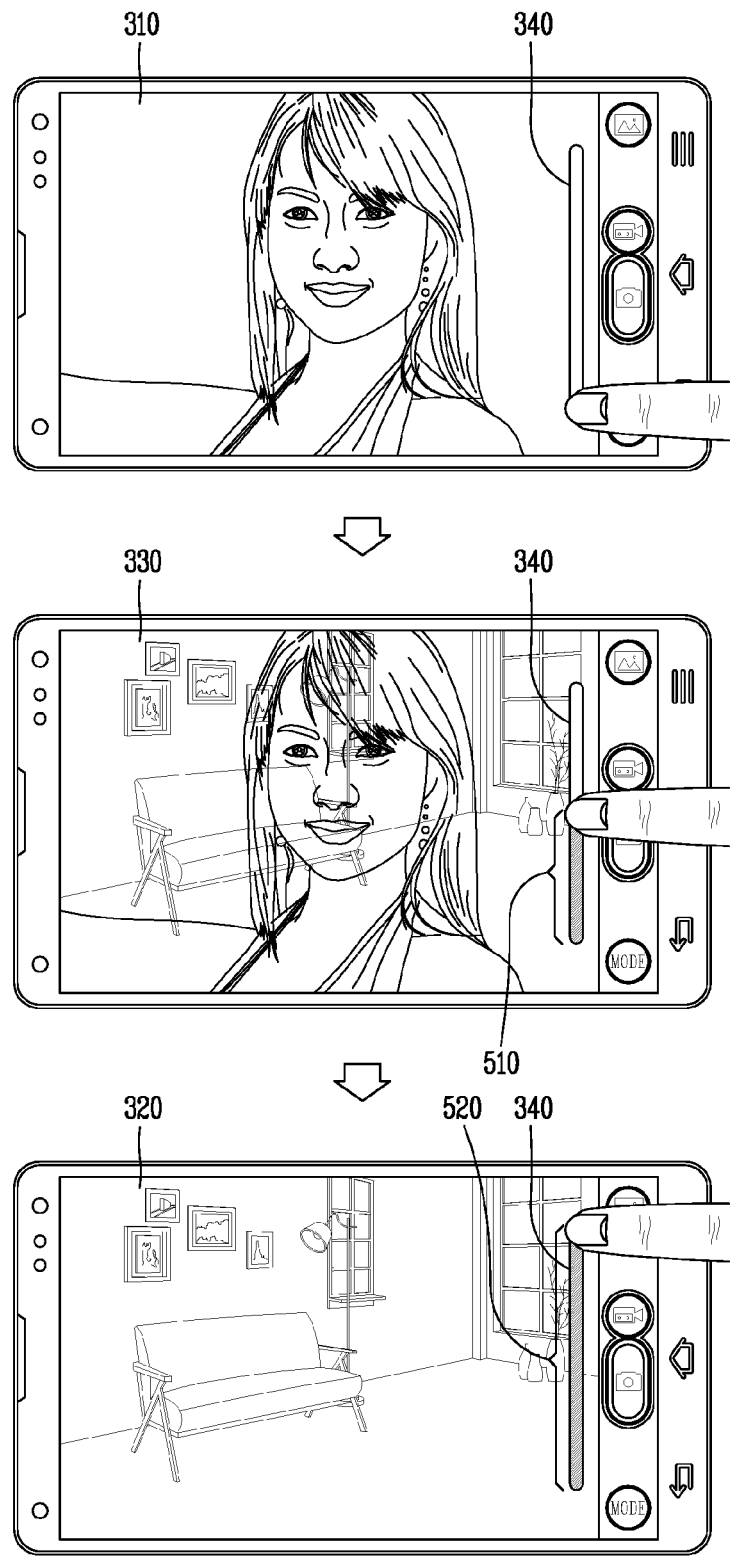
Figure 6:
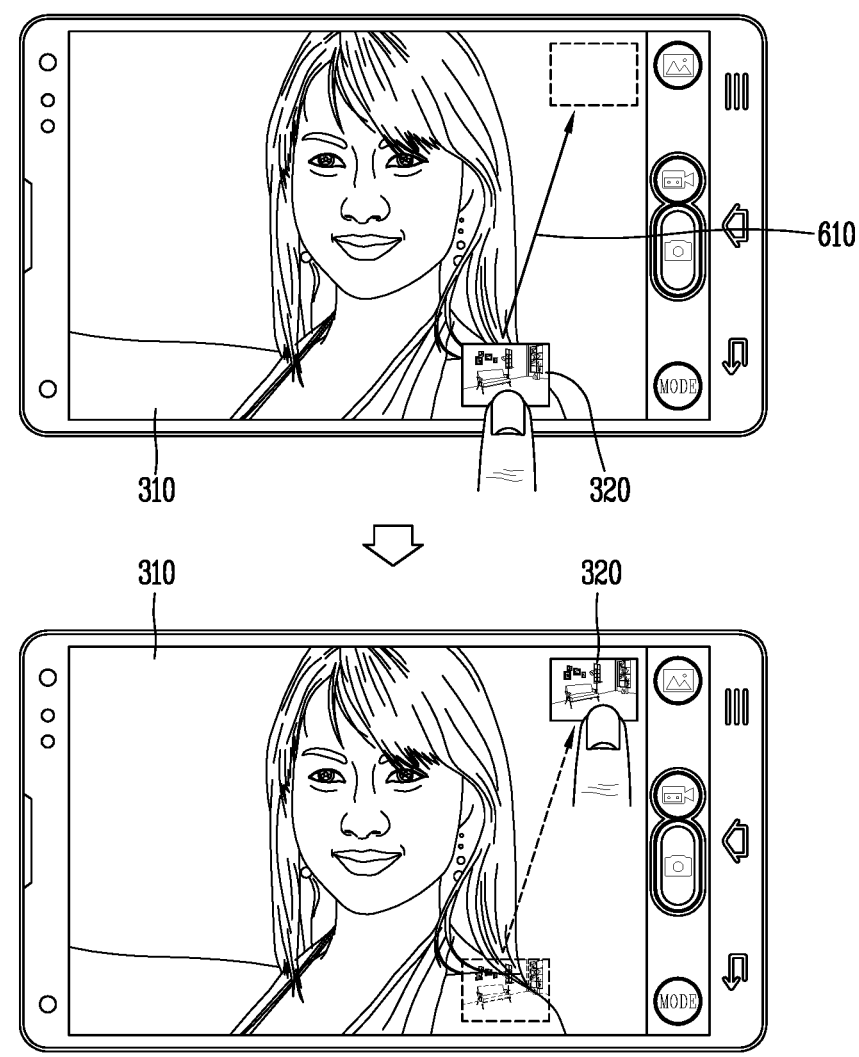

Next, FIGS. 5 through 7 are conceptual views illustrating another embodiment in which a preview image is displayed in a flip photo mode. Referring to FIG. 5, only the first preview image 310 by the front camera 121a can be displayed. Here, a gauge value (0%) is not displayed on the transparency setting bar 340.

Further, when a preset touch input is applied to the transparency setting bar 340, the first preview image 310 by the front camera 121a and the second preview image 320 by the rear camera 121b can be adjusted at the same time.

In one embodiment, when a drag input in an upward direction is applied up to a mid-point of the transparency setting bar 340, the first preview image 310 by the front camera 121a and the second preview image 320 by the rear camera 121b can be displayed in an overlapping manner. Furthermore, a gauge value 510 of 50% can be displayed on the transparency setting bar 340.

Specifically, as a drag input is applied in an upward direction, the transparency of the first preview image 310 by the front camera 121a being displayed can increase, and the transparency of the second preview image 320 by the rear camera 121b can decrease. As a result, gradually, the first preview image 310 can be dimly displayed and the second preview image 320 can be clearly displayed, and thus two images 310, 320 can be displayed in an overlapping manner.

In another embodiment, when a touch input is applied to a mid-point of the transparency setting bar 340, the first preview image 310 by the front camera 121a and the second preview image 320 by the rear camera 121b can be displayed in an overlapping manner. Furthermore, a gauge value 510 of 50% can be displayed on the transparency setting bar 340.

Similarly, when a drag input in an upward direction is applied to an uppermost point of the transparency setting bar 340, only the second preview image 320 by the rear camera 121*b* can be displayed. Furthermore, a gauge value 520 of 100% can be displayed on the transparency setting bar 340.

Specifically, as a drag input is applied in an upward direction, the transparency of the first preview image 310 by the front camera 121*a* being displayed can increase, and the transparency of the second preview image 320 by the rear camera 121*b* can decrease. As a result, the first preview image 310 can gradually disappear and only the second preview image 320 can be displayed.

In another embodiment, when a touch input is applied to an uppermost point of the transparency setting bar 340, only the second preview image 320 by the rear camera 121*b* can be displayed. Furthermore, a gauge value 520 of 100% can be displayed on the transparency setting bar 340.

Also, the controller 180 can display a plurality of preview images by the plurality of cameras, respectively, in one region of the display unit 151. Furthermore, the controller 180 can change locations displayed with the plurality of preview images based on the application of a preset user input.

In one embodiment associated therewith, referring to FIG. 6, in a flip photo mode, the first preview image 310 by the front camera 121*a* and the second preview image 320 by the rear camera 121*b* can be respectively displayed in one region of the screen 151. In one embodiment, the first preview image 310 can be displayed on the entire screen display unit 151, and a thumbnail of the second preview image 320 can be displayed in a small size on the first preview image 310. When a drag input is applied to the thumbnail of the second preview image 320, the thumbnail can move to a location to which the drag input is applied.

In another embodiment, referring to FIG. 7, the first preview image 310 can be displayed on the entire screen display unit 151, and a thumbnail of the second preview image 320 can be displayed in a small size on the first preview image 310. Subsequently, when a pinch-out input 710 is applied to the thumbnail of the second preview image 320, a size of the thumbnail can increase in proportion to the extent to which the pinch-out input is applied.

In another embodiment, when a pinch-out input 720 is applied to the thumbnail of the second preview image 320 to increase it above a predetermined size, the locations of the preview images 310, 320 being displayed can be changed. Specifically, the second preview image 320 can be displayed on the entire screen, and the thumbnail of the first preview image 310 can be displayed in a small size on the second preview image 320.

In another embodiment, when a long touch input, a tap touch input or the like other than the pinch-out input is applied thereto, the thumbnail of the second preview image 320 can be increased. Similarly, when it is increased above a predetermined size, the locations of the displayed preview images 310, 320 can be changed.

The controller 180 can also display a plurality of still images or videos corresponding to a plurality of composite images, respectively, generated in the simultaneous shooting mode based on the application of a preset user input. Furthermore, the controller 180 can generate a new composite image including an image selected among the plurality of still images and videos based on the application of a preset user input.

Figure 8:
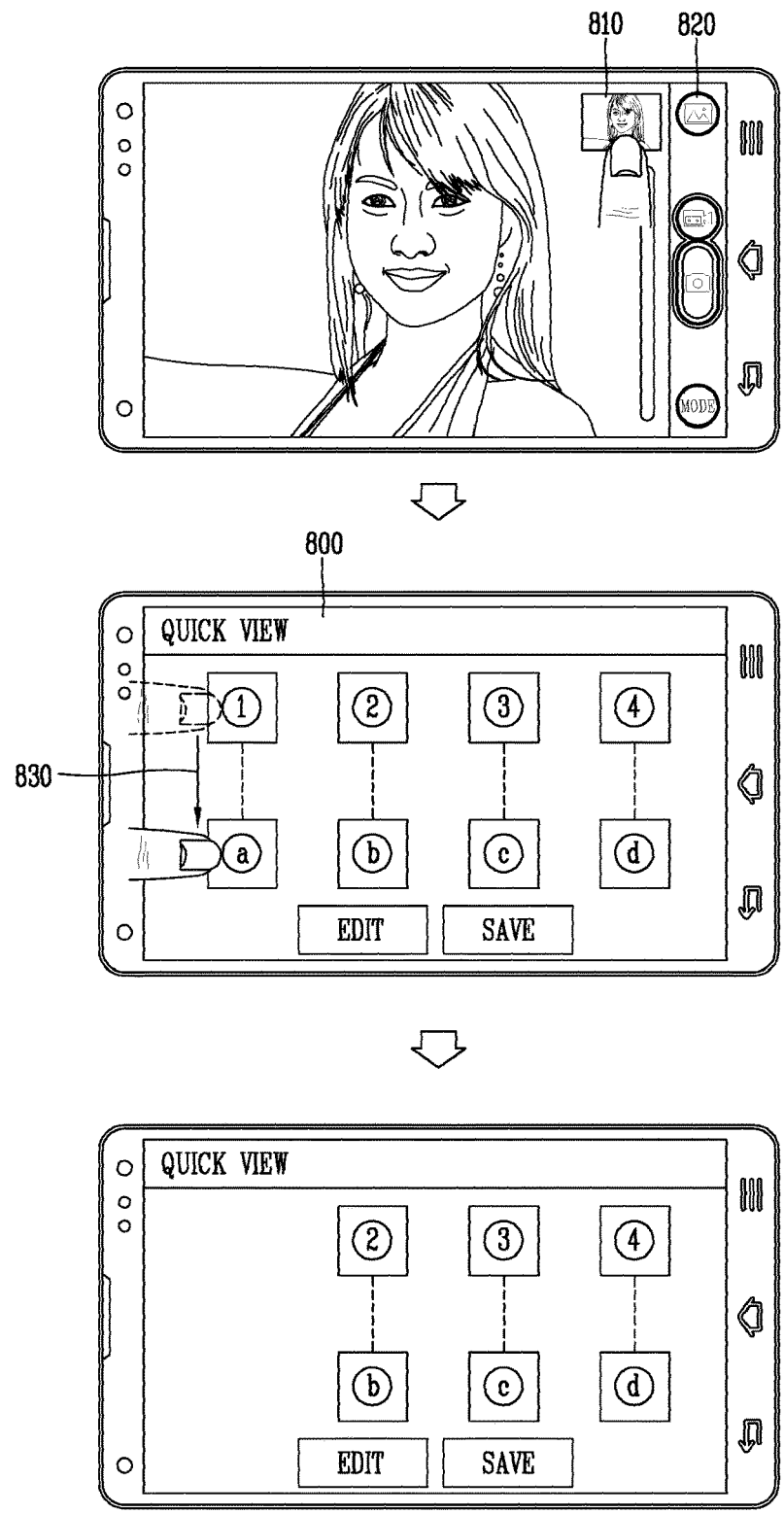
FIGS. 8 through 11 are conceptual views illustrating an embodiment in which composite images are displayed and edited.

FIGS. 8 through 11 are conceptual views illustrating an embodiment in which composite images are displayed and edited. Referring to FIG. 8, when a touch input is applied to a thumbnail icon or photo album (gallery) icon 820 corresponding to a captured image subsequent to capturing in a flip photo mode, a screen for showing a recently generated composite image can be displayed.

In one embodiment, composite images generated in a flip photo mode can be stored in a separate folder within a photo album. Accordingly, when a touch input is applied to the photo album icon 820, a folder including composite images generated in a flip photo mode can be displayed. Here, if a separate folder does not exist, it can be automatically generated. Alternatively, an indicator (refer to FIG. 17) indicating a composite image on a thumbnail of an image within the photo album can be displayed.

In another embodiment, composite images generated in a flip photo mode can be stored in a temporary storage unit until the completion of capturing (or for a predetermined period of time). Accordingly, when a touch input is applied to the thumbnail image 810 corresponding to a captured image, a folder 800 (quick view) in a temporary storage unit can be displayed.

Composite images can be displayed on the folder 800 in such a temporary storage unit according to a recently generated order. Here, still images or videos (①②③④) captured by the front camera 121*a* are displayed at the upper side, and still images or videos (ⓐⓑⓒⓓ) captured by the rear camera 121*b* can be displayed at the lower side.

Furthermore, still images or videos being displayed at the upper and lower sides images (still images or videos), the capturing times of which overlap, can be paired with each other. In other words, composite images can be defined (configured) with images (still images or videos) being paired.

Specifically, a most recently generated first composite image may include a first image (①) and an a-image (ⓐ). In other words, the first image (①) can be captured by the front camera 121*a* most recently, and the a-image (ⓐ) can be captured by the rear camera 121*b* to overlap with the capturing time of the first image (①).

Accordingly, the first image (①) can be displayed at an upper left end, and the a-image (ⓐ) can be displayed at a lower left end. In one embodiment, the a-image (ⓐ) can be displayed directly under the first image (①) to indicate images being paired with each other. In another example, a line connected between the first image (①) and the a-image (ⓐ) can be displayed.

Similarly, a second composite image generated immediately prior to generating the first composite image may include a second image (②) and a b-image (ⓑ). In other words, the second image (②) can be captured by the front camera 121*a* immediately prior to generating the first composite image, and the b-image (ⓑ) can be captured by the rear camera 121*b* to overlap with the capturing time of the second image (②).

Accordingly, the second image (②) can be displayed at the right side of the first image (①), and the b-image (ⓑ) can be displayed at the right side of the a-image (ⓐ). In one embodiment, the b-image (ⓑ) can be displayed directly under the second image (②) to indicate images being paired with each other. In another example, a line connected between the second image (②) and the b image (ⓑ) can be displayed.

In another embodiment, a drag input can be applied to delete a composite image being temporarily stored. Specifically, when a drag input from the first image (①) to the a-image (ⓐ) is applied, the first image (①) and a-image (ⓐ) can be deleted from the temporary storage folder 800. In other words, the first composite image ((①-ⓐ)) can be deleted.

Figure 9:
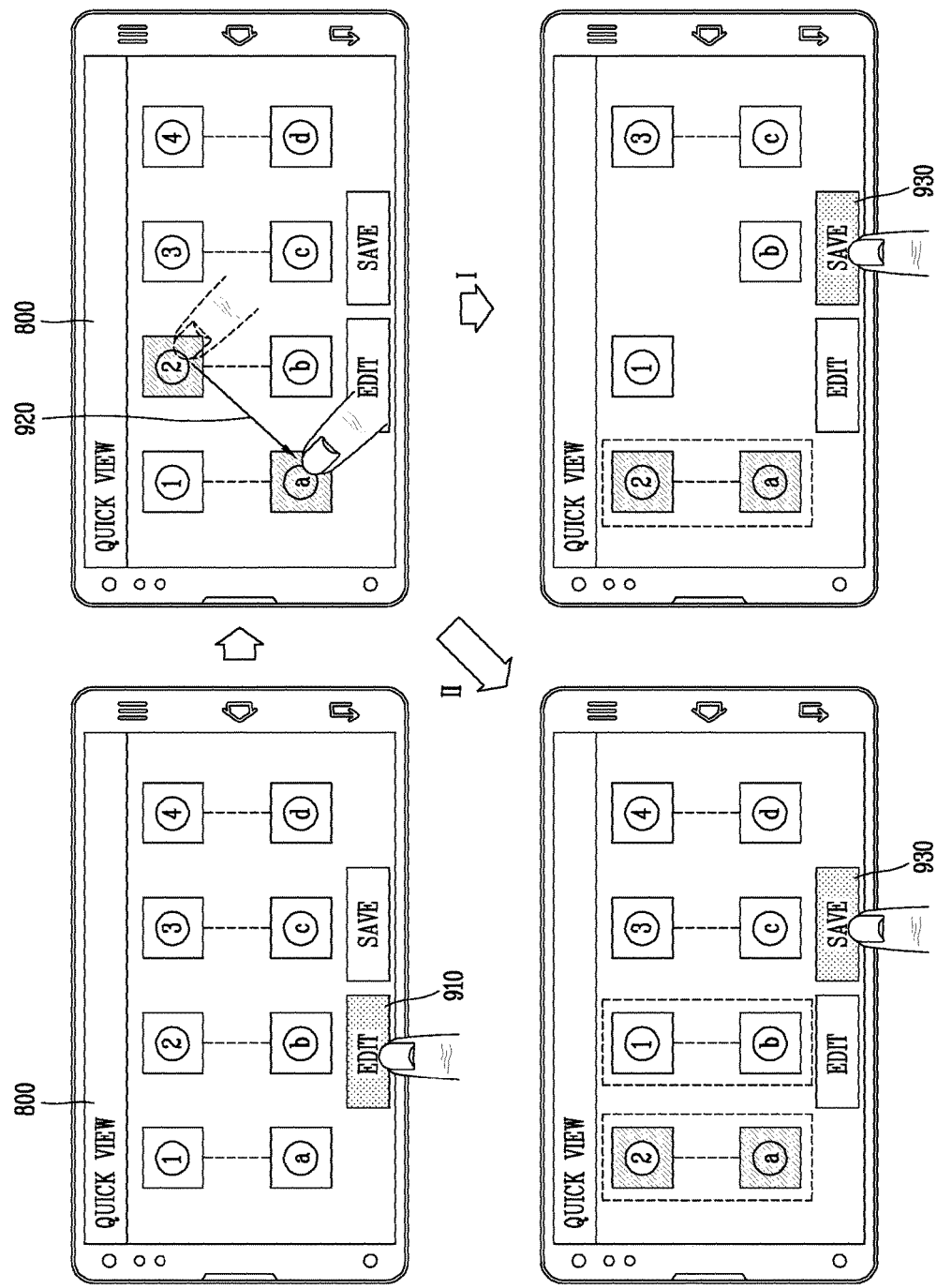

In another embodiment, referring to FIG. 9, the folder 800 (quick view) in a temporary storage unit can be displayed as illustrated in FIG. 8. Specifically, still images or videos (①②③④) captured by the front camera 121*a* are displayed at the upper side, and still images or videos (ⓐⓑⓒⓓ) captured by the rear camera 121*b* can be displayed at the lower side. Here, still images or videos being displayed at the upper and lower sides (still images or videos), the capturing times of which overlap, can be paired with each other.

Subsequently, when a touch input is applied to an edit icon 910, and then a drag input 920 from the second image (②) to the a-image (ⓐ) is applied, the first composite image ((①-ⓐ)) and second composite image ((②-ⓑ)) can be edited. In one embodiment, a new composite image ((②-ⓐ)) including the second image (②) and a-image (ⓐ) can be generated. Accordingly, the first composite image ((①-ⓐ)) and second composite image ((②-ⓑ)) can be deleted, and the first image (①) and b-image (ⓑ) may remain as one image, respectively (I).

In another embodiment, when a drag input 920 from the second image (②) to the a-image (ⓐ) is applied, a composite image ((②-ⓐ)) including the second image (②) and a-image (ⓐ) and a composite image ((①-ⓑ)) including the first image (①) and b-image (ⓑ) can be newly generated. In other words, pairs of images forming the first composite image ((①-ⓐ)) and second composite image ((②-ⓑ)) can be exchanged (II).

Then, when a touch input is applied to a save icon 930, an edit result can be stored. In one embodiment, when the first image (①) and b-image (ⓑ) remain as one image, each image can be deleted from the folder 800 in the temporary storage unit.

Figure 10:
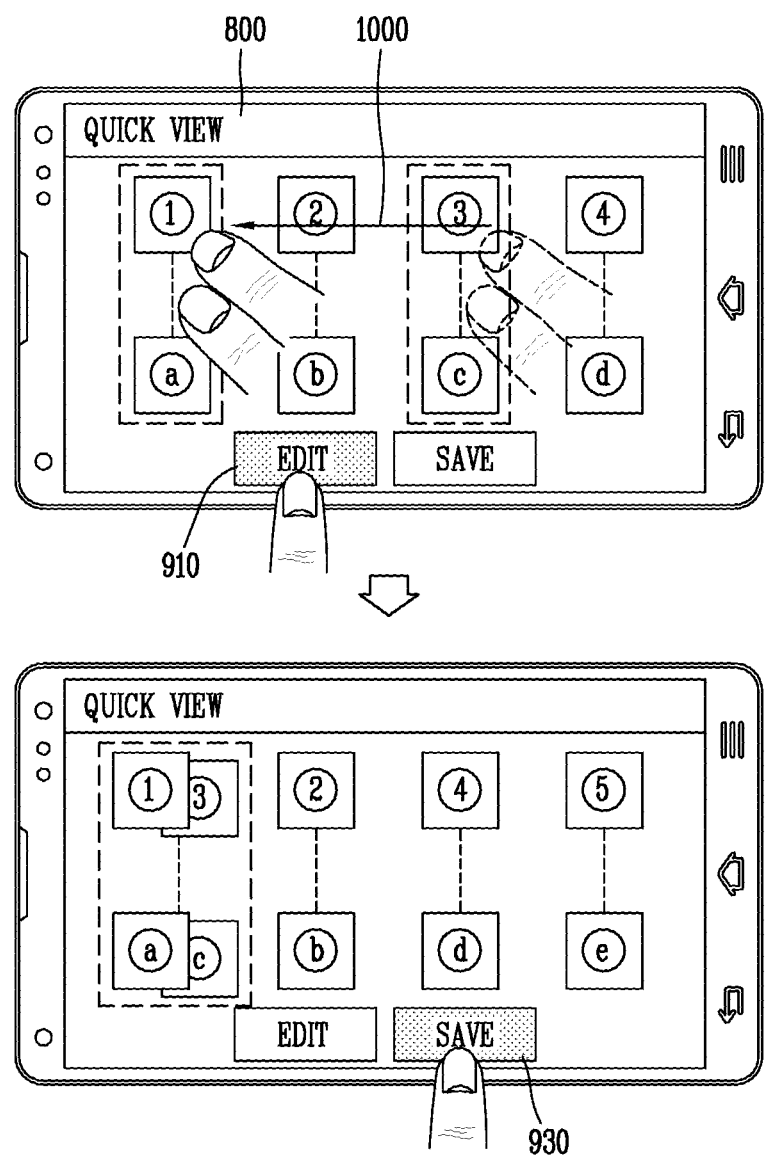
Figure 11:
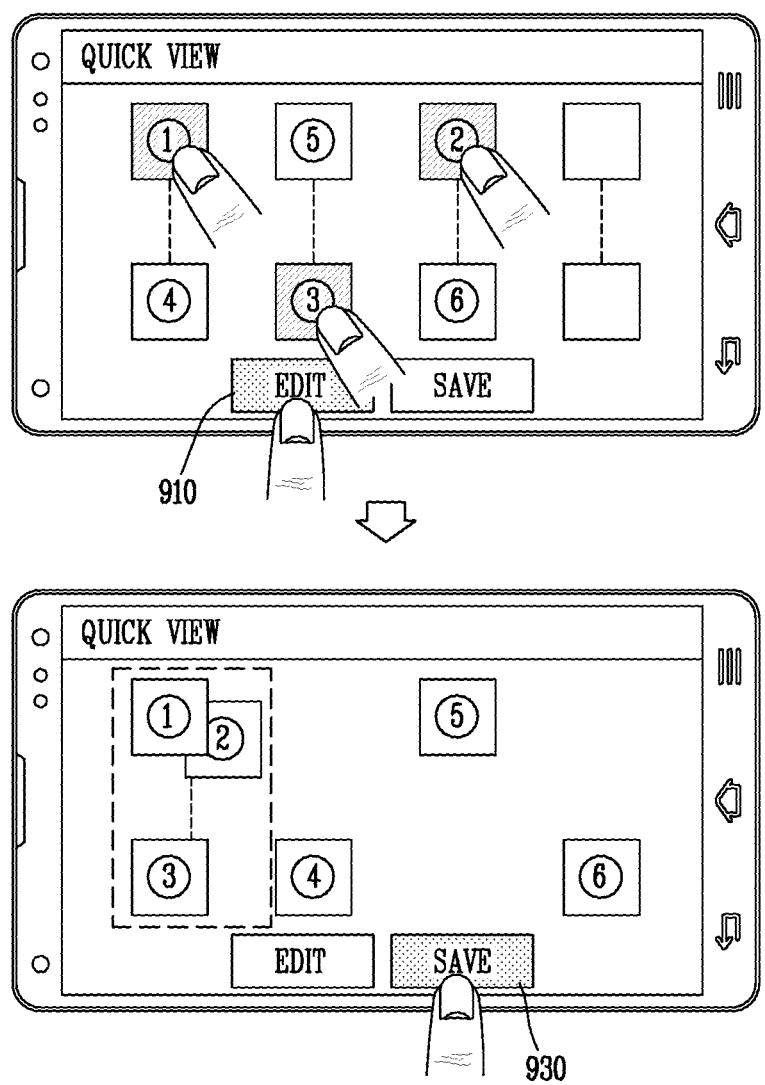

In another embodiment, referring to FIG. 10, a touch input can be applied to the edit icon 910 when that the folder 800 in the temporary storage unit is being displayed, and then a drag input 1000 by two fingers can be applied from a third composite image ((③-ⓒ)) to the first composite image ((①-ⓐ)).

Accordingly, a new composite image including the third composite image ((③-ⓒ)) and first composite image ((①-ⓐ)) can be generated. In one embodiment, the first image (①) and third image (③) captured by the front camera 121*a* can be displayed at the upper side, and the a-image (ⓐ) and c-image (ⓒ) can be displayed at the lower side while being paired. Then, when a touch input is applied to the save icon 930, an edit result can be stored.

Such an edit result can be checked through the playback of a composite image. In one embodiment, during the playback of the composite image ((①③-ⓐⓒ)), as an image captured by the front camera 121*a*, the first image (①) can be played back and then the third image (③) can be subsequently played back. Similarly, as an image captured by the rear camera 121*b*, the a-image (ⓐ) can be played back and then the c-image (ⓒ) can be played back.

In another embodiment, the order of displaying images can be changed according to the direction to which a drag input is applied. Specifically, when a drag input by two fingers is applied from the first composite image ((①-ⓐ)) to the third composite image ((③-ⓒ)), during the playback of the composite image ((①③-ⓐⓒ)), as an image captured by the front camera 121*a*, the third image (③) can be played back and then the first image (①) can be played back.

Similarly, as an image captured by the rear camera 121*b*, the c-image (ⓒ) can be played back and then the a-image (ⓐ) can be played back.

Further, a specific embodiment associated with the playback of a composite image will be described again with reference to a separate drawing. In another embodiment, referring to FIG. 11, a touch input can be applied to the edit icon 910 when the folder 800 in the temporary storage unit is being displayed, and then a still image or video desired to be included in a new composite image can be selected.

In one embodiment, when a touch input is applied to the first image (①), second image (②) and third image (③) for selection, a new composite image ((①②-③)) including the first image (①), second image (②) and third image (③) can be generated. Specifically, a composite image ((①-④)) including the first image (①) and fourth image (④), a composite image ((⑤-③)) including the fifth image (⑤) and third image (③), and a composite image ((②-⑥)) including the second image (②) and sixth image (⑥) can be deleted.

Furthermore, a composite image ((①②-③)) including the first image (①) and second image (②) as an image captured by the front camera 121*a*, and including the third image (③) as an image captured by the rear camera 121*b* can be generated. Here, the fourth image (④), fifth image (⑤) and sixth image (⑥) that have been included in the deleted composite image may respectively remain as one image. Then, when a touch input is applied to the save icon 930, an edit result can be stored.

Further, the controller 180 can control a still image to be captured by at least one of the plurality of cameras, and a video to be captured by at least another camera corresponding to a preset condition based on the application of a preset user input in the simultaneous shooting mode.

Figure 12:
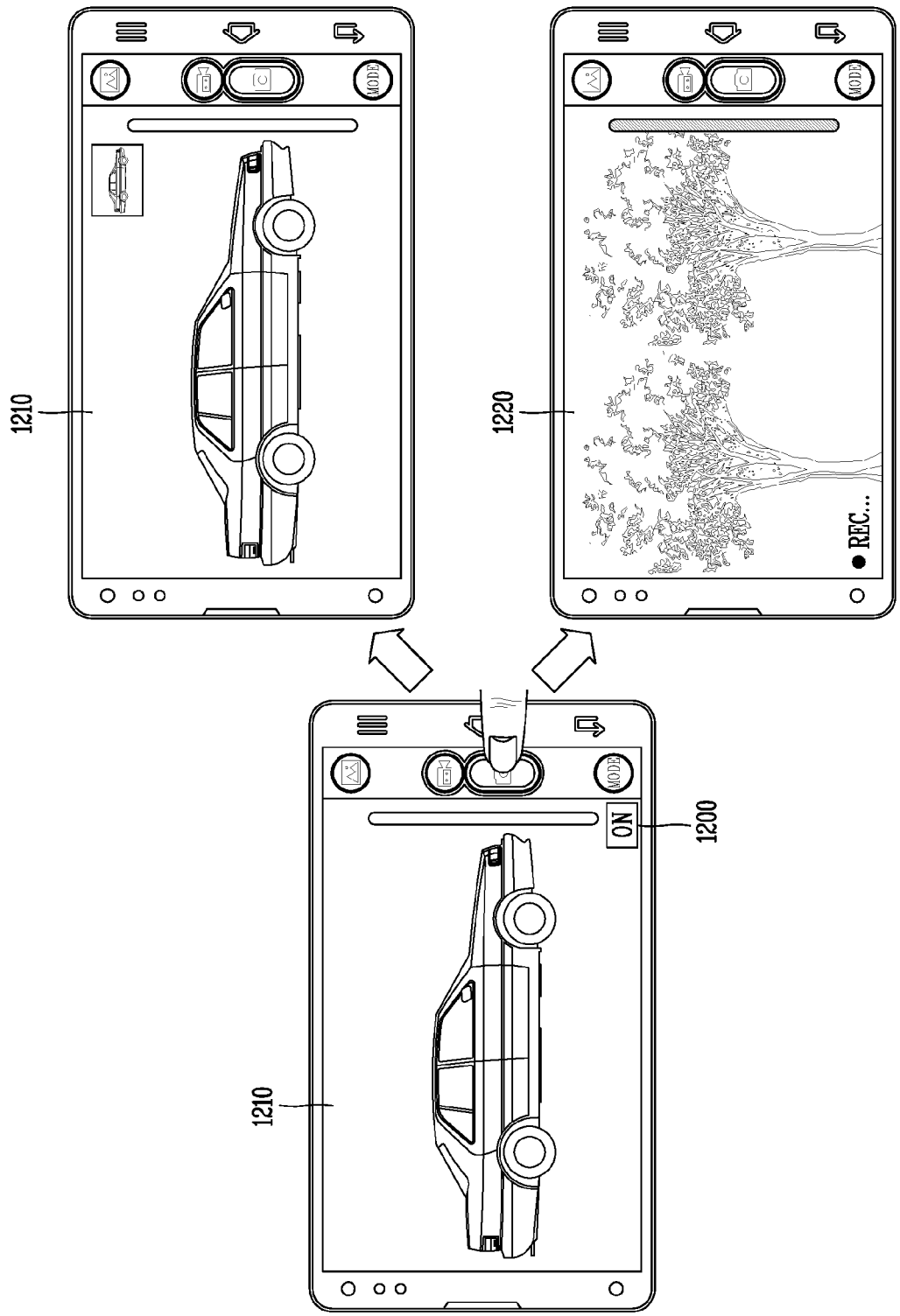
FIGS. 12 through 14 are conceptual views illustrating an embodiment in which a still image and a video are captured in a flip photo mode.
Figure 13:
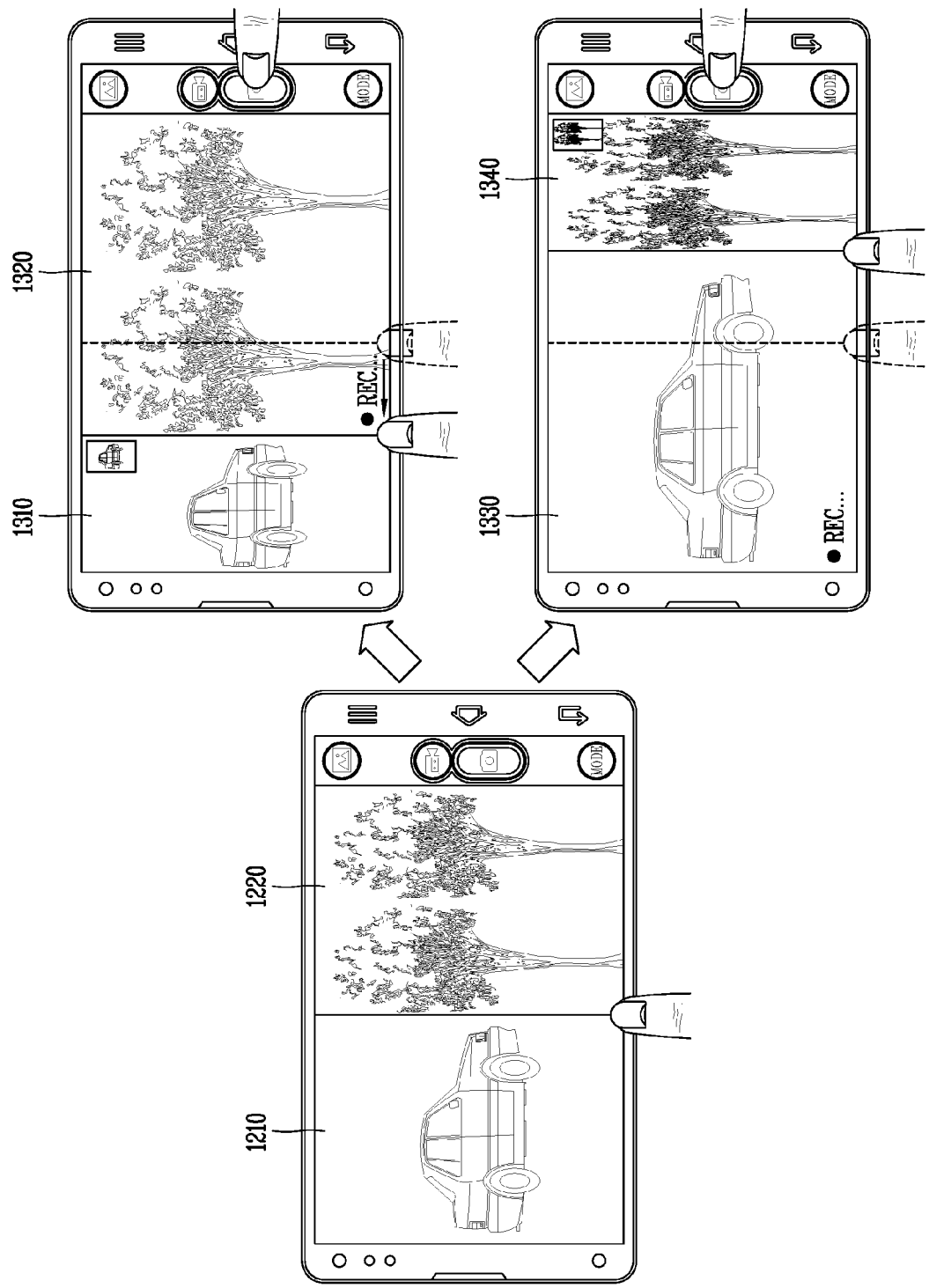
Figure 14:
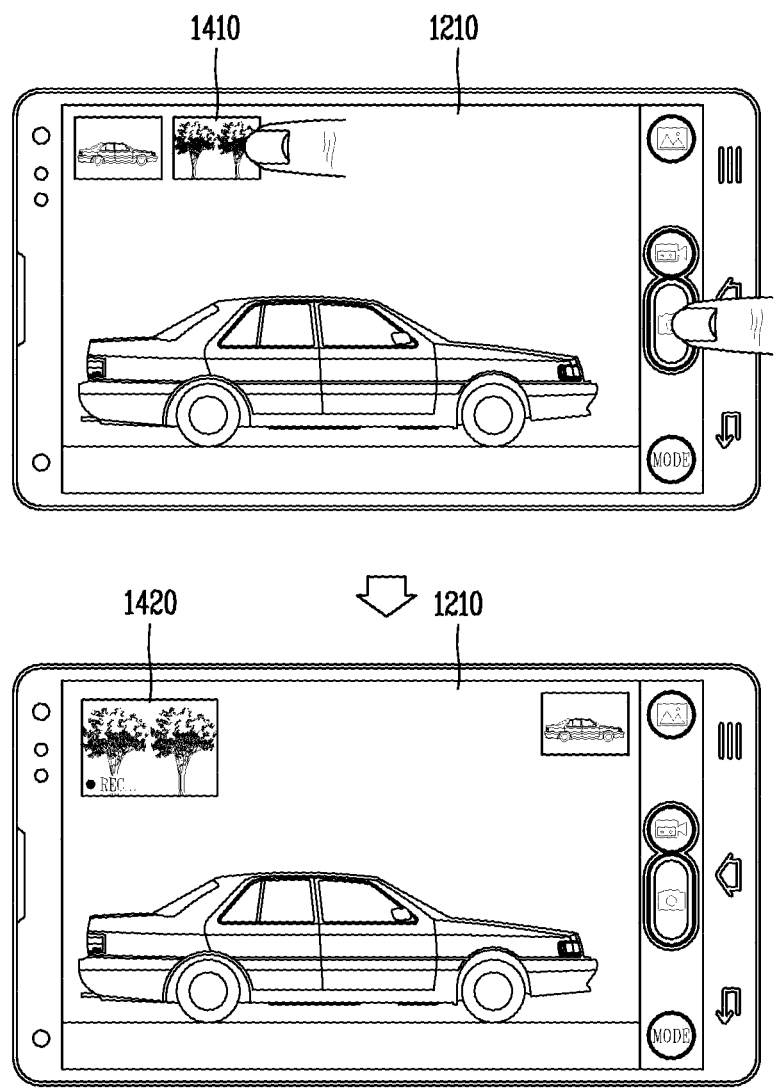

Next, FIGS. 12 through 14 are conceptual views illustrating an embodiment in which a still image and a video are captured in a flip photo mode. Specifically, when a video is captured along with a still image in a flip photo mode, a camera for capturing the video can be selected based on a size of the preview screen (FIG. 13), a preview screen (hereinafter, the detailed description thereof will be described) being currently displayed, whether or not a specific condition is sensed (FIG. 12), a user's selection (FIG. 14), and the like.

Referring to FIG. 12, a long touch input can be applied to a capture icon when a preview image 1210 by the front camera 121*a* is being displayed and a situational awareness sensor is activated (ON) in a flip photo mode. Accordingly, a still image can be captured with the front camera 121*a*, and a video can be captured with the rear camera 121*b*. In this instance, only a captured image 1210 by the front camera 121*a* can be viewed or only a video 1220 being captured by the rear camera 121*b* can be viewed.

Here, the rear camera 121*b* can capture a video for a short moment upon sensing a specific situation. Specifically, the specific situation can be sensed based on the movement of the terminal 100, the movement of a subject, other information, and the like. For example, a video can be captured to seize a moment at which the movement of a subject is sensed (a moment of extinguishing candles on a cake, a moment at which a batter hits the ball in a baseball field, and the like) or capture a moment of snowing, raining, sunset, sunrise or the like by analyzing the weather or receiving the weather information.

Further, a situational awareness sensor can be configured with various sensors to sense the situation. For example, the situational awareness sensor may include a voice recognition sensor, and a sensor capable of sensing the movement of an object within a subject. In another embodiment, a video by the rear camera 121b can be captured from a moment at which an image is captured by the front camera 121a. At this time, the rear camera 121b can capture a video only for a short moment.

In another embodiment, a still image can be captured using a camera on which a preview image is currently being displayed, and a video can be captured using a camera on which a preview image is not viewed. In this instance, referring to FIG. 12 again, a still image can be captured using the front camera 121a on which a preview image 1210 is currently being displayed, and a video can be captured using the rear camera 121b.

Thus, according to the embodiment of FIG. 12, a composite image including a still image and a video (video for a short moment) can be generated. Further, the controller 180 can set a size of a region being displayed with the plurality of preview images based on the application of a preset user input, and select a plurality of cameras to capture image images or videos among the plurality of cameras.

In one embodiment associated therewith, referring FIG. 13, the entire screen 151 can be divided into a first region and a second region with the same size. Accordingly, a preview image 1210 by the front camera 121a and a preview image 1220 by the rear camera 121b can be displayed on the divided first and second regions, respectively.

Here, a size of the divided first and second regions can be adjusted to select a camera on which a video (or still image) is to be captured. In one embodiment, between the front camera 121a and rear camera 121b, a video can be captured using a camera for displaying a preview image on a larger region.

Specifically, when a drag input in the left direction is applied to increase a size of the second region and decrease a size of the first region and then a touch input is applied to the capture icon, a still image 1310 can be captured using the front camera 121a and a video 1320 can be captured using the rear camera 121b.

Similarly, when a drag input in the right direction is applied to increase a size of the first region and decrease a size of the second region and then a touch input is applied to the capture icon, a video 1330 can be captured using the front camera 121a and a still image 1340 can be captured using the rear camera 121b. As described above, according to the embodiment of FIG. 13, a composite image including a still image and a video (video for a short moment) can be generated.

In another embodiment for selecting a camera on which a video is to be captured, referring to FIG. 14, when a touch input is applied to a thumbnail 1410 or icon of the preview image by the rear camera 121b, the rear camera 121b can be selected as a camera for capturing a video.

Then, when a touch input is applied to the capture icon, an image 1210 can be captured by the front camera 121a, and a video 1420 can be captured by the rear camera 121b. In one embodiment, the video 1420 being captured by the rear camera 121b or a thumbnail of the video can be displayed in a small size on a portion of the screen 151. As described above, according to the embodiment of FIG. 14, a composite image including a still image and a video (video for a short moment) can be generated.

Figure 15:
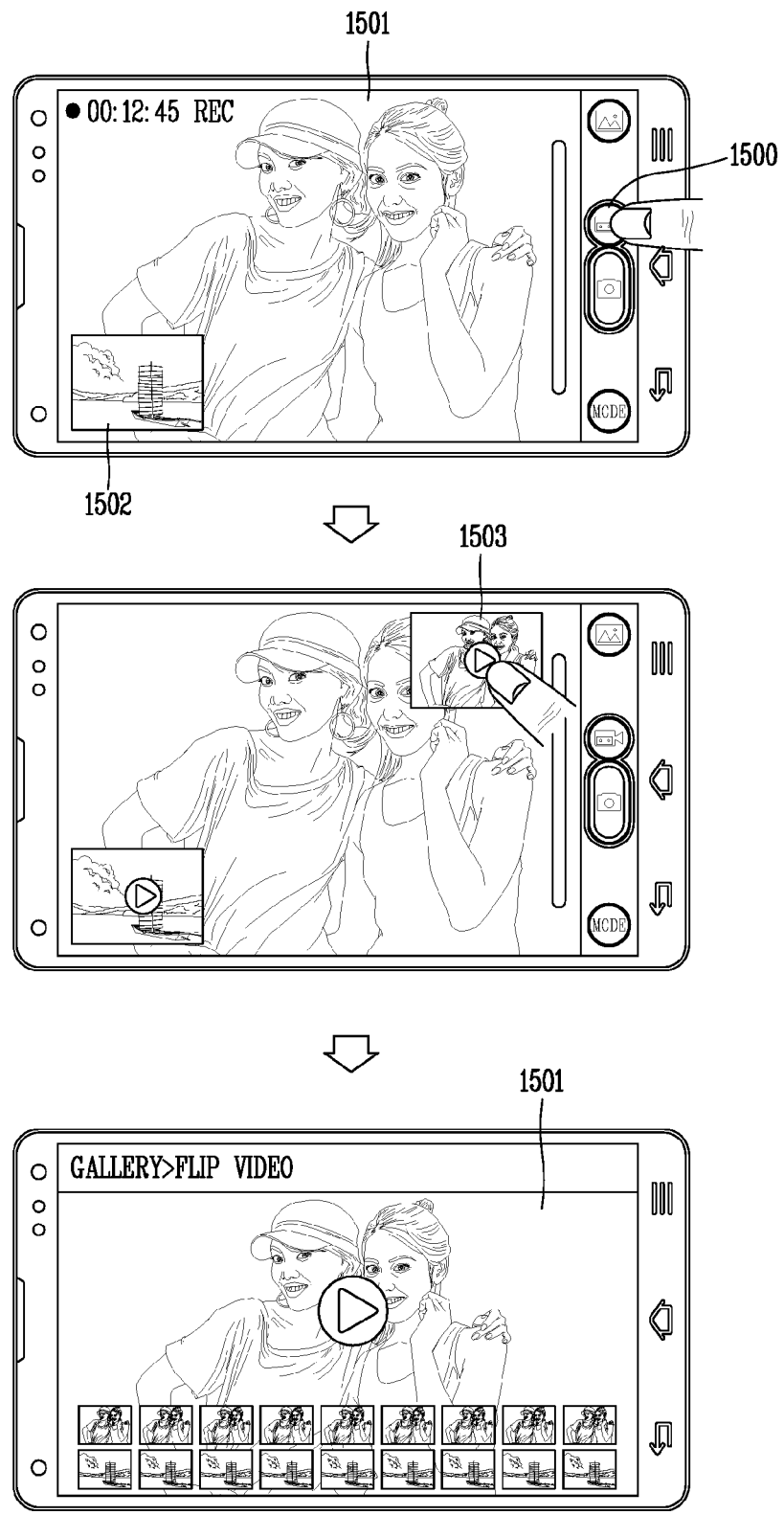
FIG. 15 is a conceptual view illustrating an embodiment in which a plurality of videos are captured in a flip photo mode.

FIG. 15 is a conceptual view illustrating an embodiment in which a plurality of videos are captured in a flip photo mode. Referring to FIG. 15, when a touch input is applied to a video icon 1500 in a flip photo mode, a video can be captured by the front camera 121a and rear camera 121b, respectively.

In one embodiment, a first video 1501 being captured by the front camera 121a can be displayed on the entire screen 151, and a second video 1502 being captured by the rear camera 121b can be displayed in a small size on a portion of the screen 151. When the capture is completed, one composite image including the first video 1501 and second video 1502 can be generated. Furthermore, an icon 1503 corresponding to the first video 1501 can be displayed.

Subsequently, when a touch input is applied to the icon 1503, a folder in which a composite image is temporarily stored or a folder in which a composite image within a photo album is separately stored can be displayed. In one embodiment, the first video 1501 can be displayed on the entire screen 151, and each image included in the first video 1501 and second video 1502 can be displayed on the same time line.

Figure 16:
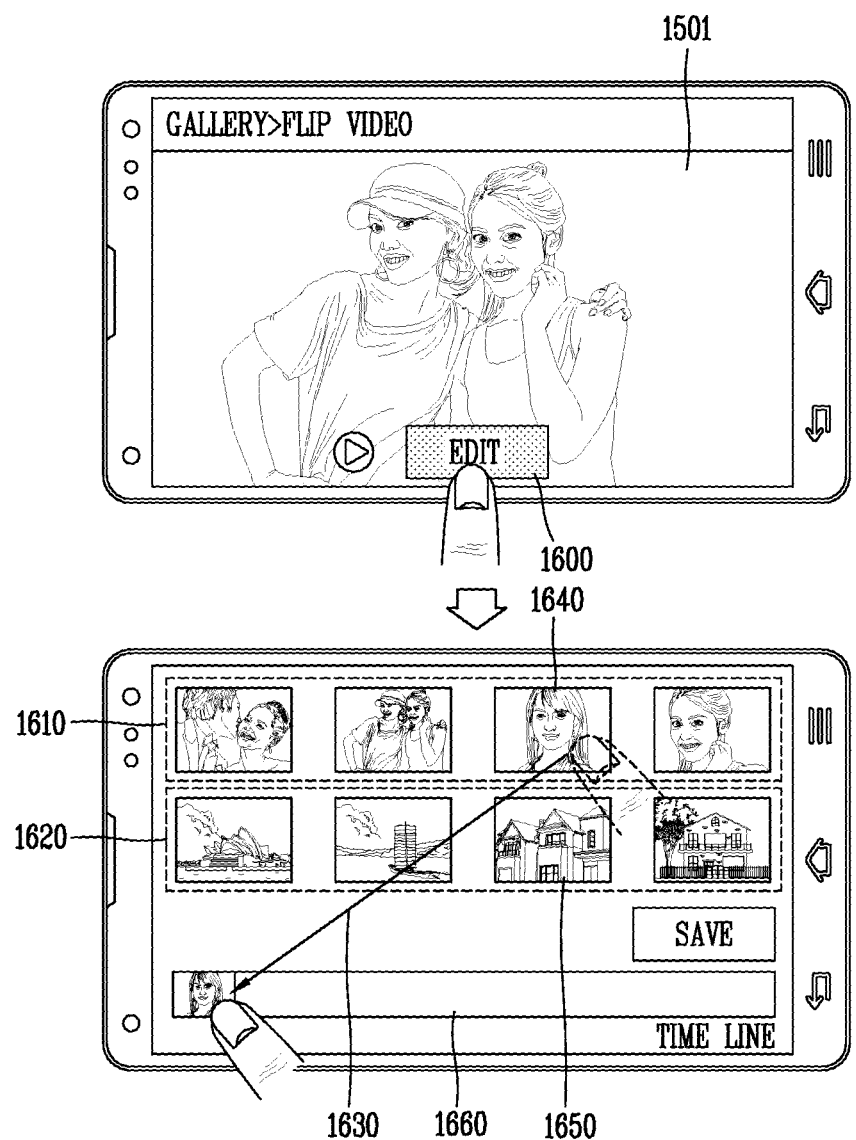
FIG. 16 is a conceptual view illustrating an embodiment in which a composite image consisting of a plurality of videos is edited.

FIG. 16 is a conceptual view illustrating an embodiment in which a composite image including a plurality of videos is edited. Referring to FIG. 16, when a touch input is applied to the icon 1503 in FIG. 15, a folder in which a composite image is temporarily stored or a folder in which a composite image within a photo album is separately stored can be displayed.

In one embodiment, the first video 1501 can be displayed on the entire screen 151, and an edit icon 1600 can be displayed at an lower end. When a touch input is applied to the edit icon 1600, a time line 1660 for generating a new video, images included in the first video 1501, images 1620 included in the second video 1502 can be displayed according to a time sequence.

Specifically, images 1610 included in the first video 1501 captured by the front camera 121a can be displayed at an upper side, and images 1620 included in the second video 1502 captured by the rear camera 121b can be displayed at a lower side. The images 1610, 1620 can be respectively displayed according to a captured time sequence. Accordingly, images captured at the same time can be displayed with a pair. For example, a first image 1640 and a second image 1650 can be displayed with a pair at the upper and lower sides as images captured at the same time.

Subsequently, a drag input can be applied to one of the images 1610, 1620 to move them to the time lime 1660 for generating a new video. As a result, it can be possible to generate a video played back with desired scenes (images). In one embodiment, when a drag input to the time lime 1660 is applied on the first image 1640, a thumbnail of the first image 1640 can be displayed on the time lime 1660. Subsequently, a drag input to the time lime 1660 can be applied on other images to select scenes (images) that follow the first image 1640, and a touch input can be applied to the save icon to generate a new video.

Further, the controller 180 can display at least one still image included in a composite image at preset time intervals based on the application of a preset user input when another still image included in the composite image generated in the simultaneous shooting mode is being displayed. In one embodiment, a still image being displayed can be switched based on a (force) touch input, an input of tilting the body, an eye tracking, a tactile sensing change, or the like.

Figure 17:
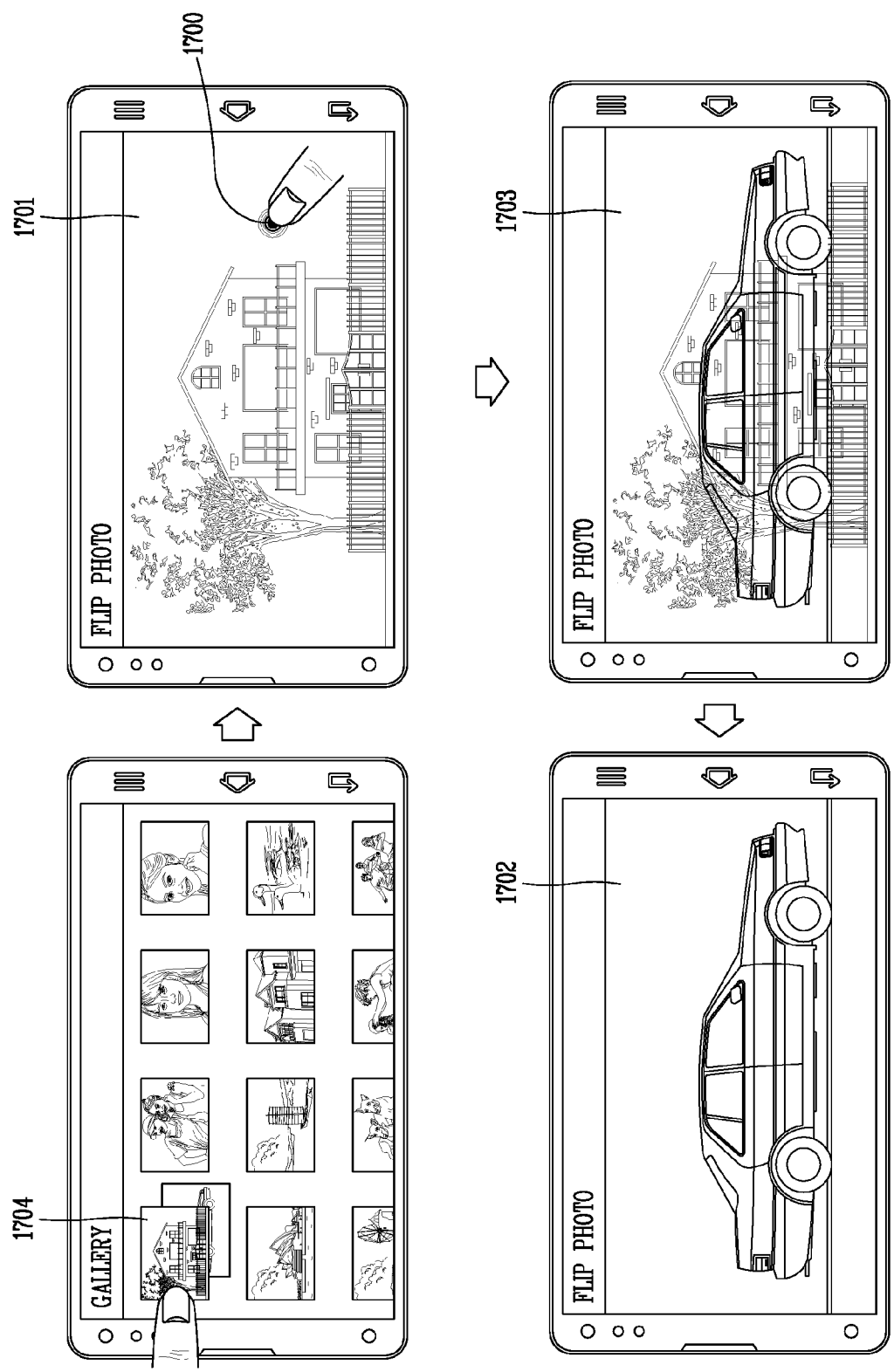
FIGS. 17 and 18 are conceptual views illustrating an embodiment in which a composite image consisting of a plurality of still images is played back.
Figure 18:
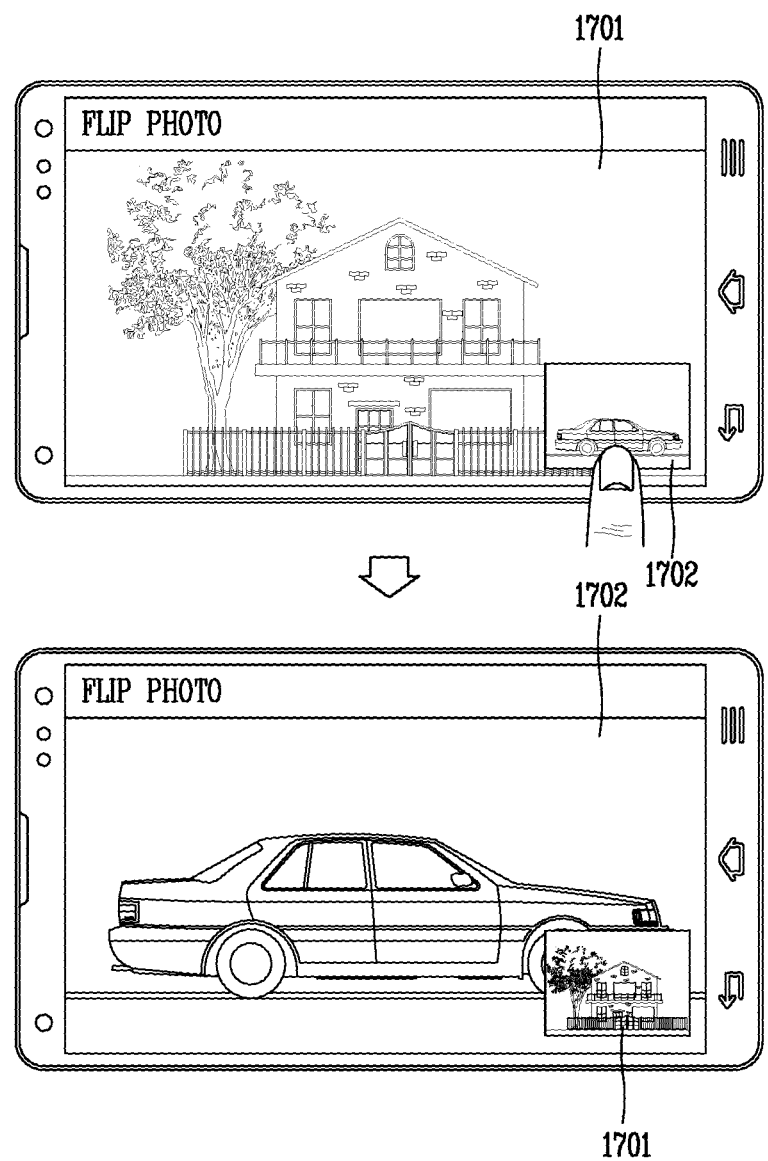

FIGS. 17 and 18 are conceptual views illustrating an embodiment in which a composite image including a plurality of still images is played back. Referring to FIG. 17, as described above, composite images generated in a flip photo mode can be stored in a temporary storage space or a separate folder within a photo album. Alternatively, when a separate folder within a photo album does not exist, an indicator for indicating a composite image can be displayed on a thumbnail or the thumbnail can be displayed in a preset specific shape.

In one embodiment, an icon having a specific shape can be displayed (F) on a thumbnail of the first composite image within a photo album. In another embodiment, a thumbnail 1704 of the first composite image within a photo album can be displayed in a shape in which a first still image 1701 and a second still image 1702 included in the first composite image overlap.

Subsequently, when a touch input is applied to the thumbnail 1704, the first still image 1701 can be displayed on the entire screen 151. Then, when a long touch input 1700 is applied to the first still image 1701, an image 1703 in which the first still image 1701 and second still image 1702 overlap can be displayed for a predetermined period of time. Then, the second still image 1702 can be displayed again for a predetermined period of time.

In other words, according to the embodiment of FIG. 17, still images included in a composite image can be sequentially displayed by a touch input. In another embodiment, when a breath is infused into the first still image 1701, the first still image 1701 disappears while displaying the second still image 1702. At this time, the first still image and second still image can be displayed in an overlapping manner for a predetermined period of time.

In another embodiment, a displayed image can be switched according to a physical distance between the user and the terminal 100. Specifically, a first still image can be displayed when a distance between the user and terminal 100 is close. Subsequently, as the distance between the user and terminal 100 becomes far, the first still image can be gradually dimmed, and the second still image can be clearly displayed (eye tracking).

In another embodiment, a first still image or second still image can be displayed according to an angle or direction of tilting the terminal 100. When an image is switched in the foregoing embodiments, an image can be immediately switched to another image, and gradually switched in an overlapping manner for a predetermined period of time.

In another embodiment, referring to FIG. 18, the first still image 1701 included in the first composite image can be displayed on the entire screen 151, and the second still image 1702 captured along with the first still image 1701 at the same time maybe displayed in a separate one region.

Subsequently, when a long touch input is applied to the second still image 1702, the display locations of the images 1701, 1702 can be changed to each other. In other words, the second still image 1702 can be displayed on the entire screen 151, and the first still image 1701 can be displayed in a separate one region.

Further, the controller 180 can display only a still image or video based on the application of a preset user input when the still image and the video included in a composite image generated in the simultaneous shooting mode are being displayed in an overlapping manner.

Figure 19:
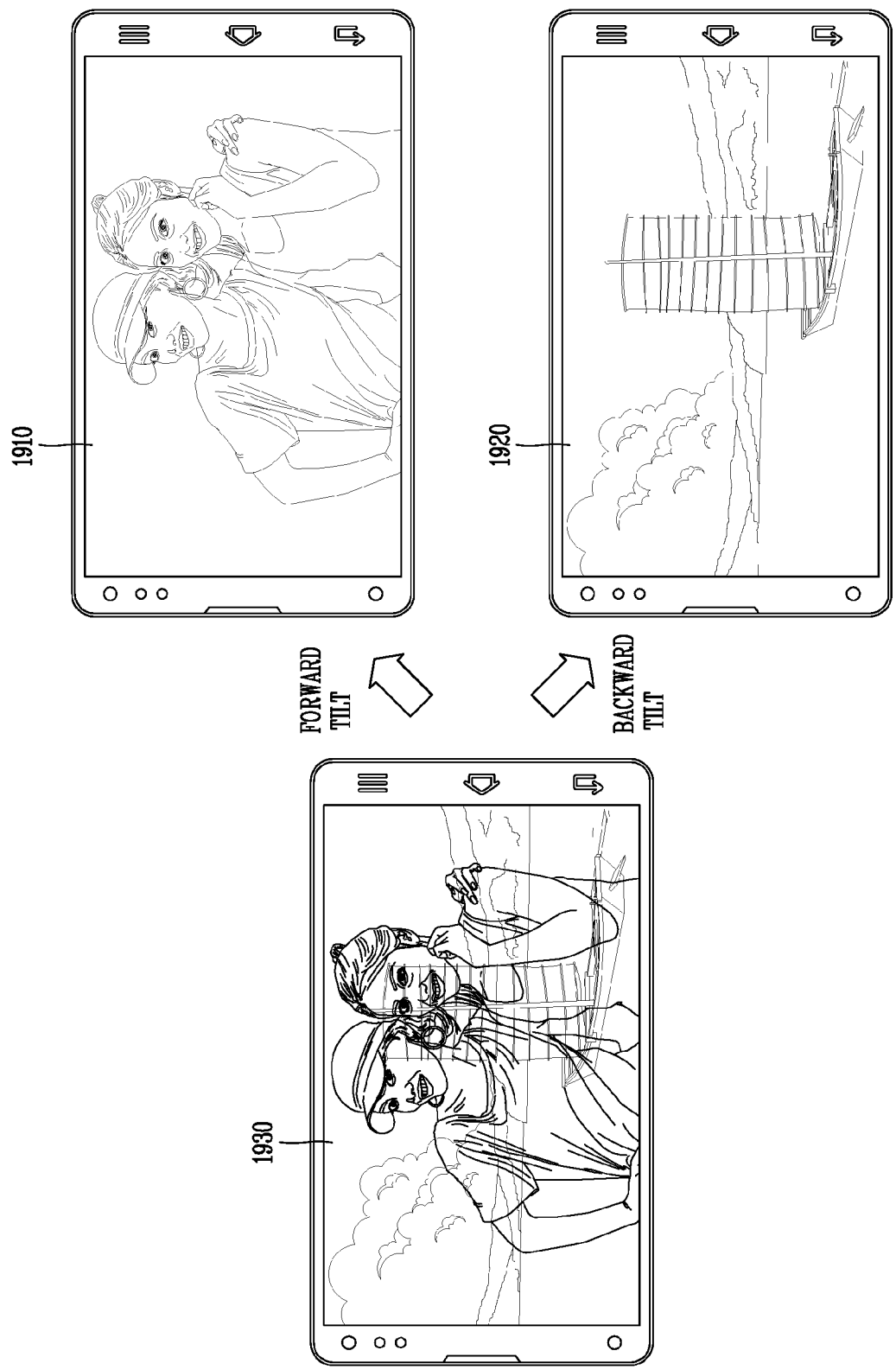
FIGS. 19 through 21 are conceptual views illustrating an embodiment in which a composite image consisting of a plurality of still images and videos is played back.
Figure 20:
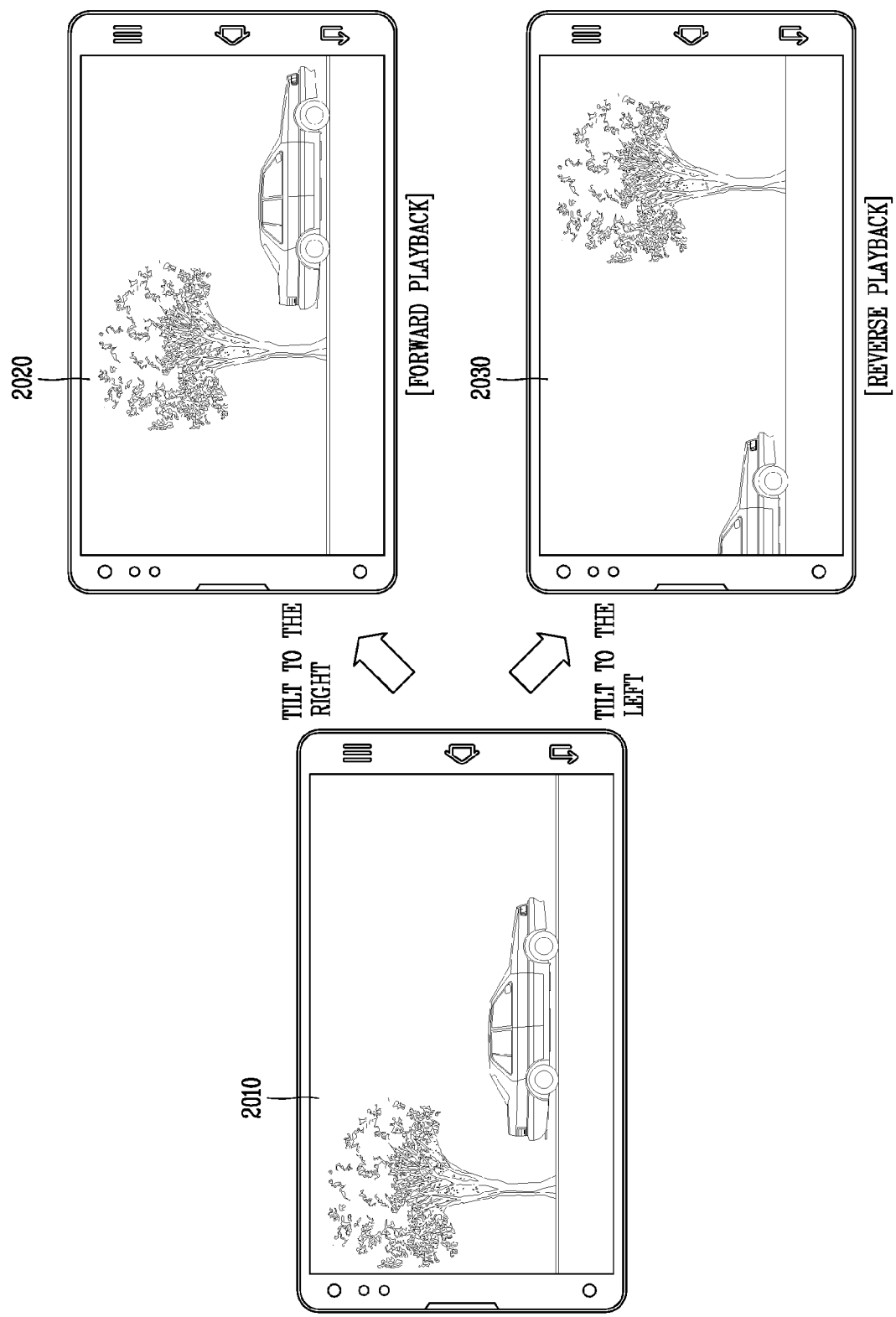
Figure 21:
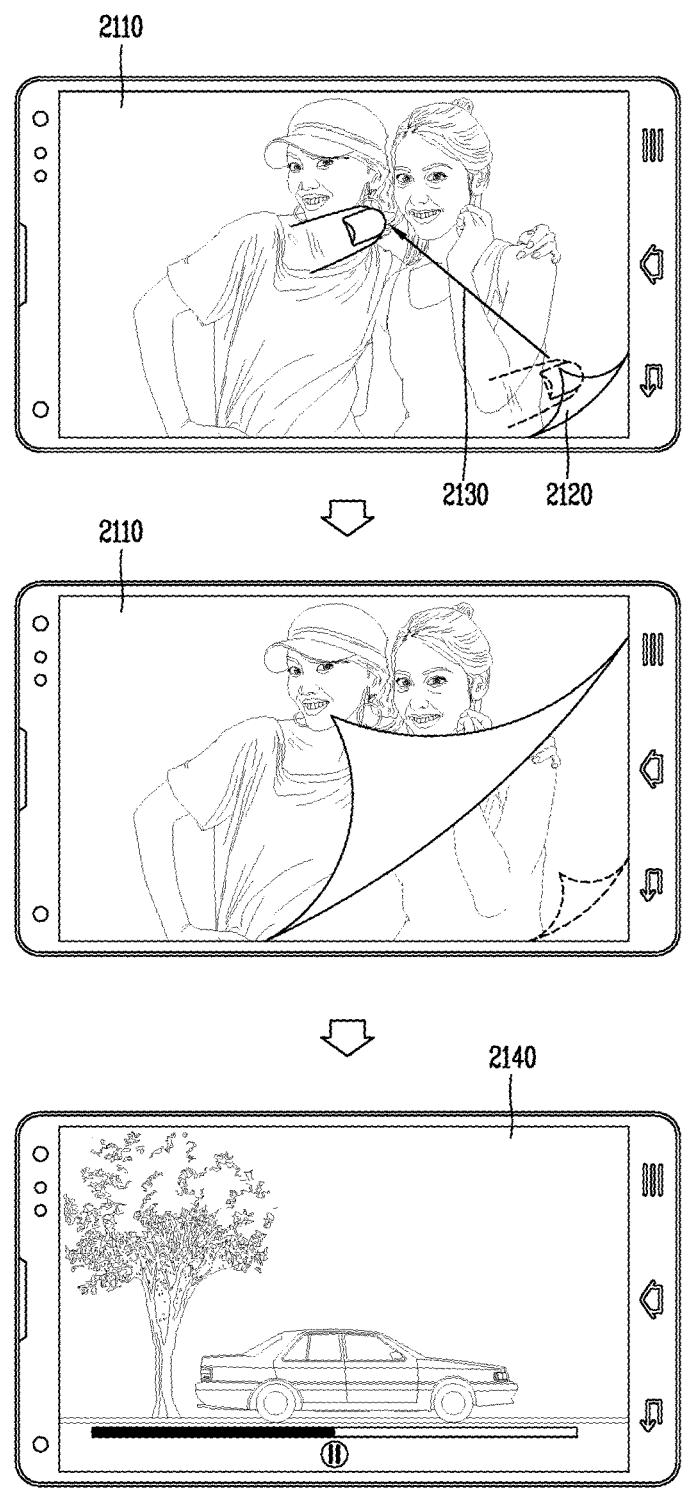

FIGS. 19 through 21 are conceptual views illustrating an embodiment in which a composite image consisting of a plurality of still images and videos is played back. Referring to FIG. 19, a composite image may include a still image 1910 and a video 1920, and can be displayed with an image 1930 in which initial or major screens (images) of the still image 1910 and video 1920 overlap.

Subsequently, only an image captured by the front camera 121a or rear camera 121b can be selectively displayed according to a direction of tilting the terminal 100. In one embodiment, when the terminal 100 is tilted by a predetermined angle in a forward direction (to tilt a front surface of the body to an outer side of the user), only the still image 1910 captured by the front camera 121a can be displayed on the entire screen 151.

In another embodiment, when the terminal 100 is tilted by a predetermined angle in a backward direction (to tilt a front surface of the body to an inner side of the user), only the video 1930 captured by the rear camera 121b can be displayed on the entire screen 151. Further, the controller 180 can play back the video in a forward or reverse direction based on the application of a preset user input when a video included in the composite image is being displayed.

Referring to FIG. 20, a playback direction of a video 2010 included in a composite image can be set according to a direction of tilting the terminal 100. In one embodiment, when the terminal 100 is tilted to the right side by a predetermined angle based on the user, the video 2010 can be played back (2020) in a forward direction. In another embodiment, when the terminal 100 is tilted to the left side by a predetermined angle based on the user, the video 2010 can be played back (2030) in a reverse direction. Further, the controller 180 can display a video included in a composite image based on the application of a preset user input when a still image included in the composite image generated in the simultaneous shooting mode is being displayed.

Referring to FIG. 21, when a composite image is consisted of a still image 2110 and a video 2140, the still image 2110 can be displayed on the entire screen 151. At this time, an indicator 2120 for indicating the existence of the video 2140, the capturing time of which overlaps, can be displayed at a lower end of the still image 2110 being displayed. For example, a portion 2120 in which an image seems to be folded can be displayed.

Subsequently, when a drag input 2130 is applied to the portion 2120, an animation effect of turning over the image can be displayed. Furthermore, the video 2140 captured at the same time can be displayed on the entire screen 151. Further, the controller 180 can play back a still image or video that has captured an object based on the application of a preset user input selecting the object within a still image or video when the still image or video included in a composite image generated in the simultaneous shooting mode is being displayed.

Figure 22:
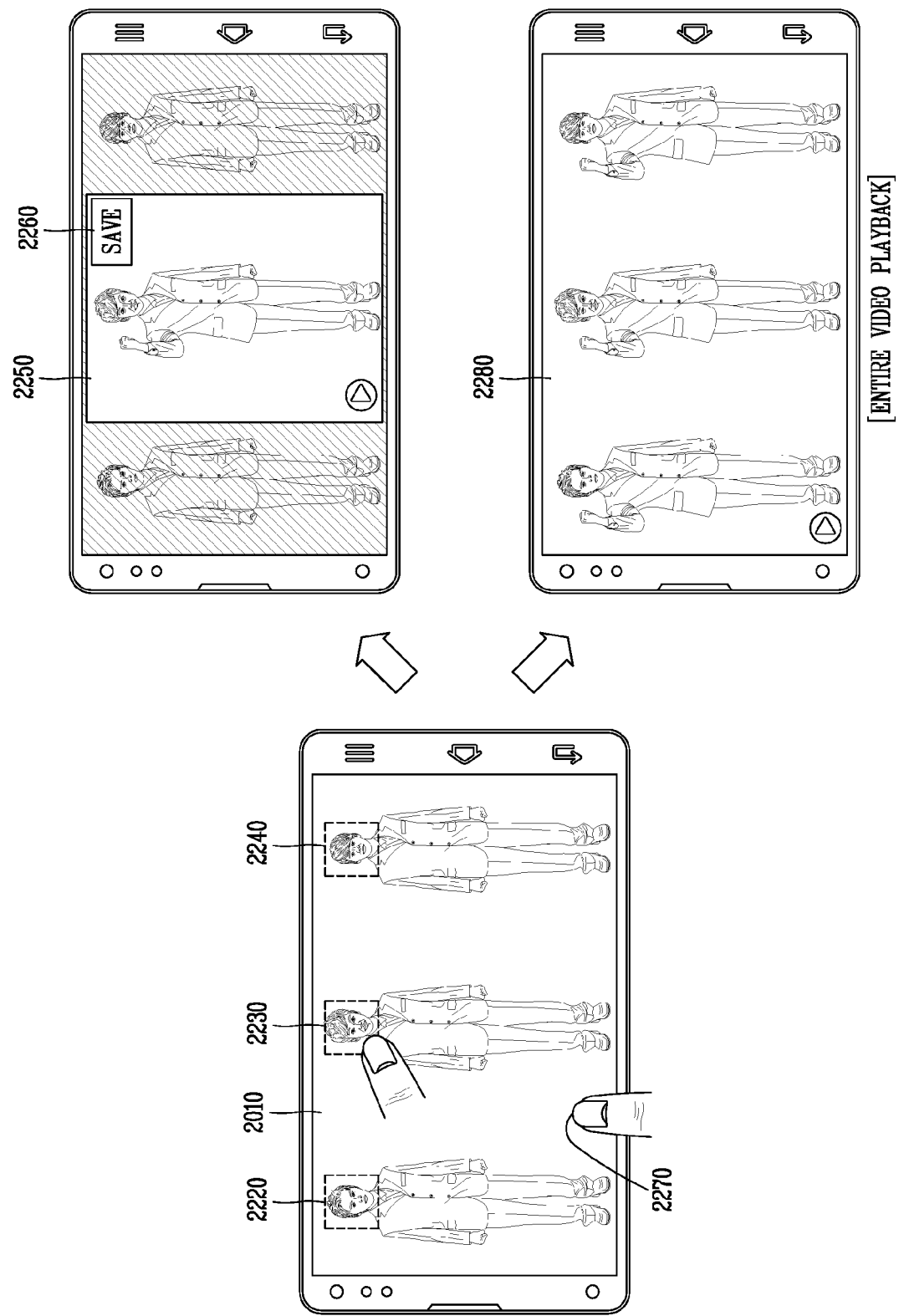
FIG. 22 is a conceptual view illustrating an embodiment in which only a portion displayed with a specific object on a video is separately played back.

FIG. 22 is a conceptual view illustrating an embodiment in which only a portion displayed with a specific object on a video is separately played back. Referring to FIG. 22, a focus region 2220, 2230, 2240 for selecting a specific subject can be displayed on a video 2210 captured for a short period of time. For example, the focus region 2220, 2230, 2240 can be displayed with a circle, a rectangle or the like to include a face of a figure.

At this time, when a touch input is applied to a first focus region 2230 including a first figure, a portion 2250 in which the first figure is a main subject on the video 2210 can be played back on a separate window. Furthermore, when a touch input is applied to the save icon 2260, the portion 2250 in which the first figure is a main subject on the video 2210 can be stored as a separate video file.

In another embodiment, when a touch input is applied to a background region 2270 other than a figure on the video 2210, the video 2210 can be played back 2280 on the entire screen 151. According to the embodiment of FIG. 22, only a portion of a specific object on the entire video can be played back or separately stored.

Figure 23:
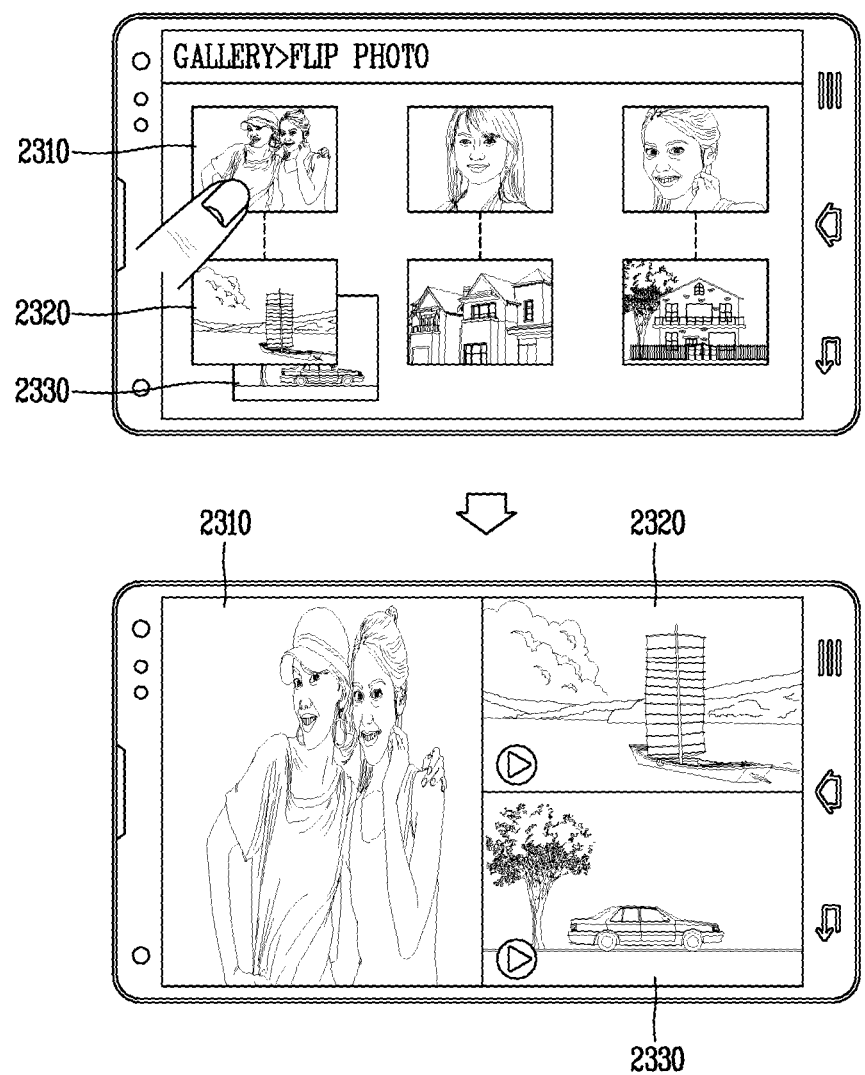
FIG. 23 is a conceptual view illustrating another embodiment in which a composite image consisting of a plurality of still images and videos is played back.

FIG. 23 is a conceptual view illustrating another embodiment in which a composite image including a plurality of still images and videos is played back. Referring to FIG. 23, as described above, a composite image may include still images or videos captured by a plurality of cameras.

In one embodiment, a first composite image may include a first still image 2310 captured by the front camera 121a, an a-video 2320 captured by a first rear camera, a b-video 2330 captured by a second rear camera. Specifically, when a touch input is applied to a capture icon in a flip photo mode, the front camera 121a can capture a first still image 2310. Furthermore, the first rear camera and second rear camera can capture the a-video 2320 and b-video 2330, respectively.

At this time, the videos 2320, 2330 can be captured along with the first still image 2310 at the same time or captured when a specific condition such as the movement of a subject is sensed. Then, a first composite image including the first image 2310, a-video 2320 and b-video 2330 can be generated. The first composite image can be stored in a separate temporary storage folder or stored in a separate folder within a gallery.

In one embodiment, the first still image 2310 captured by the front camera 121a can be displayed at an upper side, and the a-video 2320 and b-video 2330 captured by the first and the second rear camera, respectively, can be displayed at a lower side while being paired. At this time, a line for connecting images with a pair can be displayed.

Subsequently, when an input for selecting a first composite image, for example, a touch input to a thumbnail of the first still image 2310, is applied, the first composite image can be displayed. Specifically, the first still image 2310, a-video 2320 and b-video 2330 can be displayed on each of the divided screens 151. At this time, each image can be played back at the same time.

Further, when the generated composite image is shared, individual images included in the composite image can be shared or the entire composite image can be shared. Furthermore, as described above, a composite image and individual images included in the composite image can be respectively stored, and the composite image can be changed to an individual image. For example, the first image can be deleted from the first and the second image included in the composite image. As a result, only the second image remains.

Further, the controller 180 can control still images to be consecutively captured by one of the plurality of cameras based on the application of a preset user input in the simultaneous shooting mode, and generate a composite image in which the same objects within the consecutively captured still images are combined to be displayed at the same time.

Figure 24:
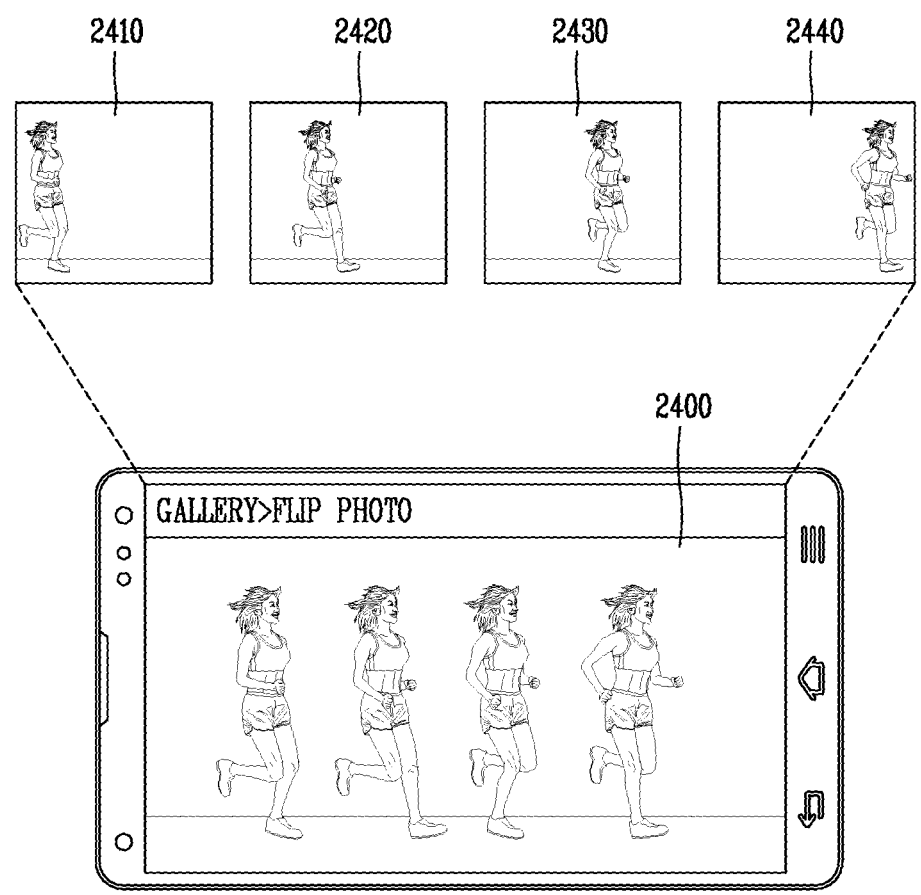
FIGS. 24 and 25 are conceptual views illustrating an embodiment associated with the playback of consecutively captured still images.
Figure 25:
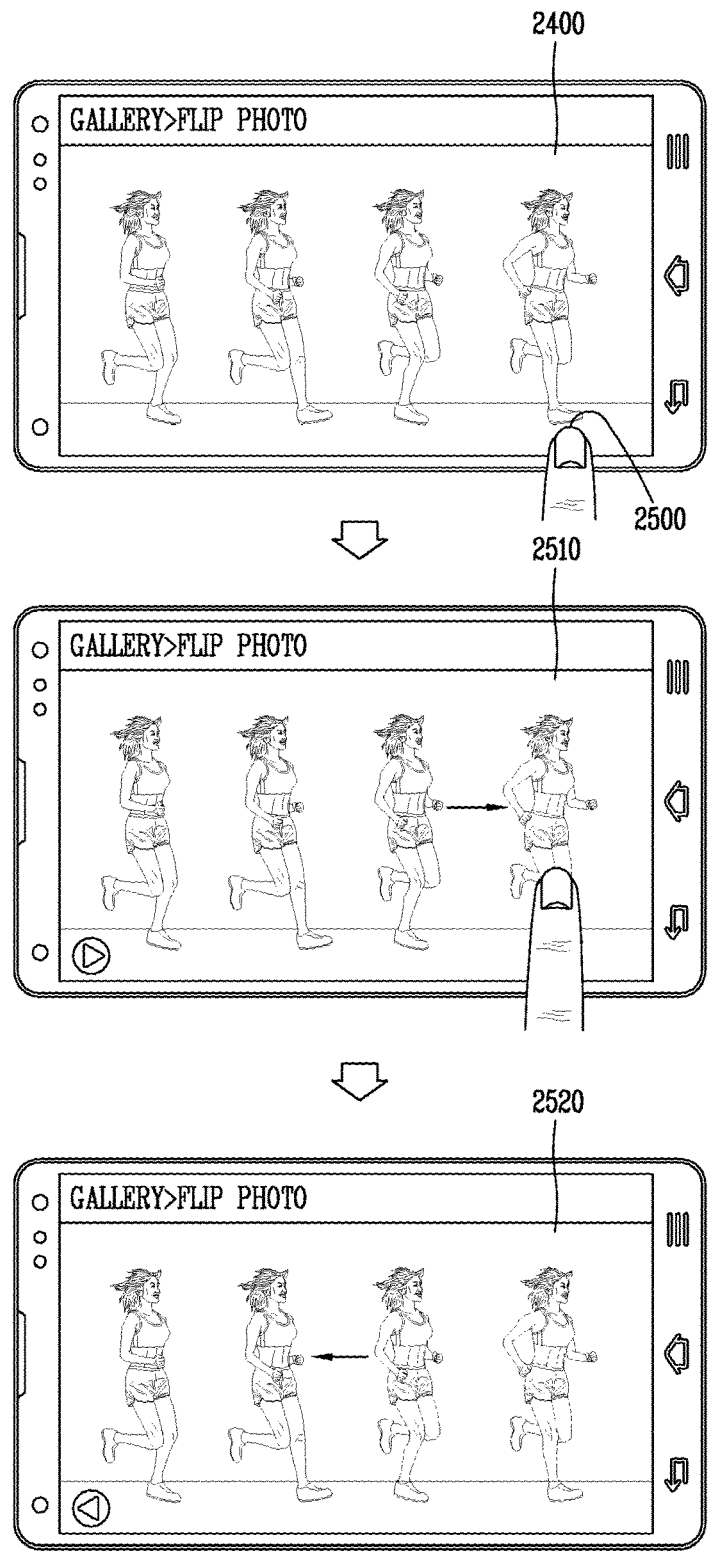

FIGS. 24 and 25 are conceptual views illustrating an embodiment associated with the playback of consecutively captured still images. Referring to FIG. 24, when a specific shooting technique is selected in a flip photo mode, a plurality of images 2410, 2420, 2430, 2440 can be captured at short time intervals.

At this time, when the movement of a subject is sensed, one composite image 2400 in which a subject is combined with a background image can be generated. The composite image 2400 can be stored in a separate folder within a photo album. In another embodiment, another composite image including the composite image 2400 can be generated. Specifically, a composite image including the composite image 2400 and the plurality of images 2410, 2420, 2430, 2440 captured at short time intervals can be generated.

Further, the controller 180 can display the consecutively captured still images in a capture sequence based on a preset user input applied to the composite image. In another embodiment, the controller 180 can display the consecutively captured still images in a reverse order to the capture sequence based on a preset user input applied to the composite image.

As an embodiment that follows FIG. 24, referring to FIG. 25, a plurality of images captured at short time intervals while a touch input 2500 is applied to the composite image 2400 can be sequentially displayed (2510) according to a time sequence.

In this instance, a subject at a next time can be displayed when a subject at a previous time has been displayed. Accordingly, the process of moving a subject can be sequentially displayed according to a time sequence. In another embodiment, when a finger touching the composite image 2400 is released, a plurality of images captured at short time intervals can be displayed (2520) in a reverse order to the capture time sequence.

Figure 26:
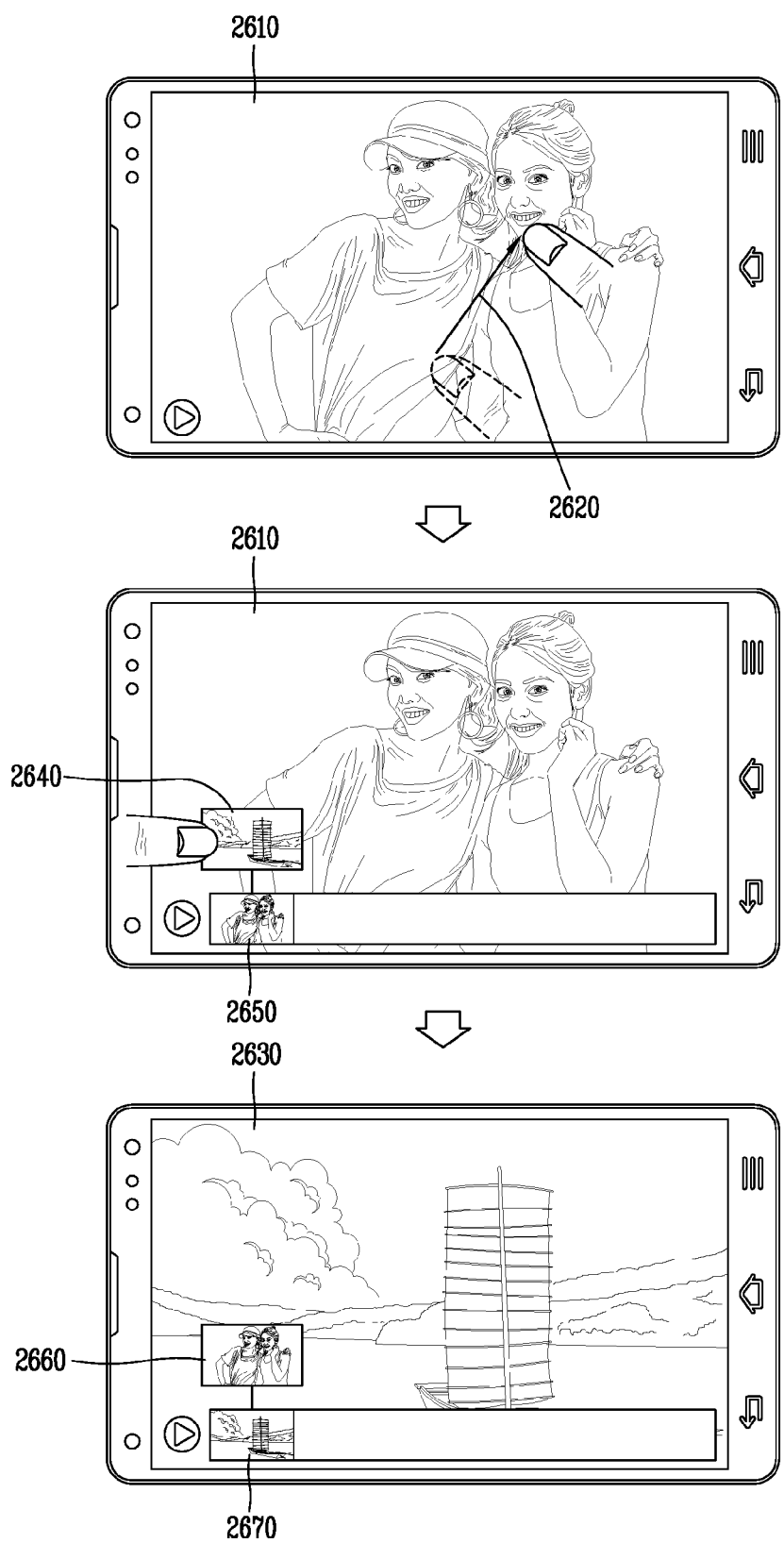
Figure 28:
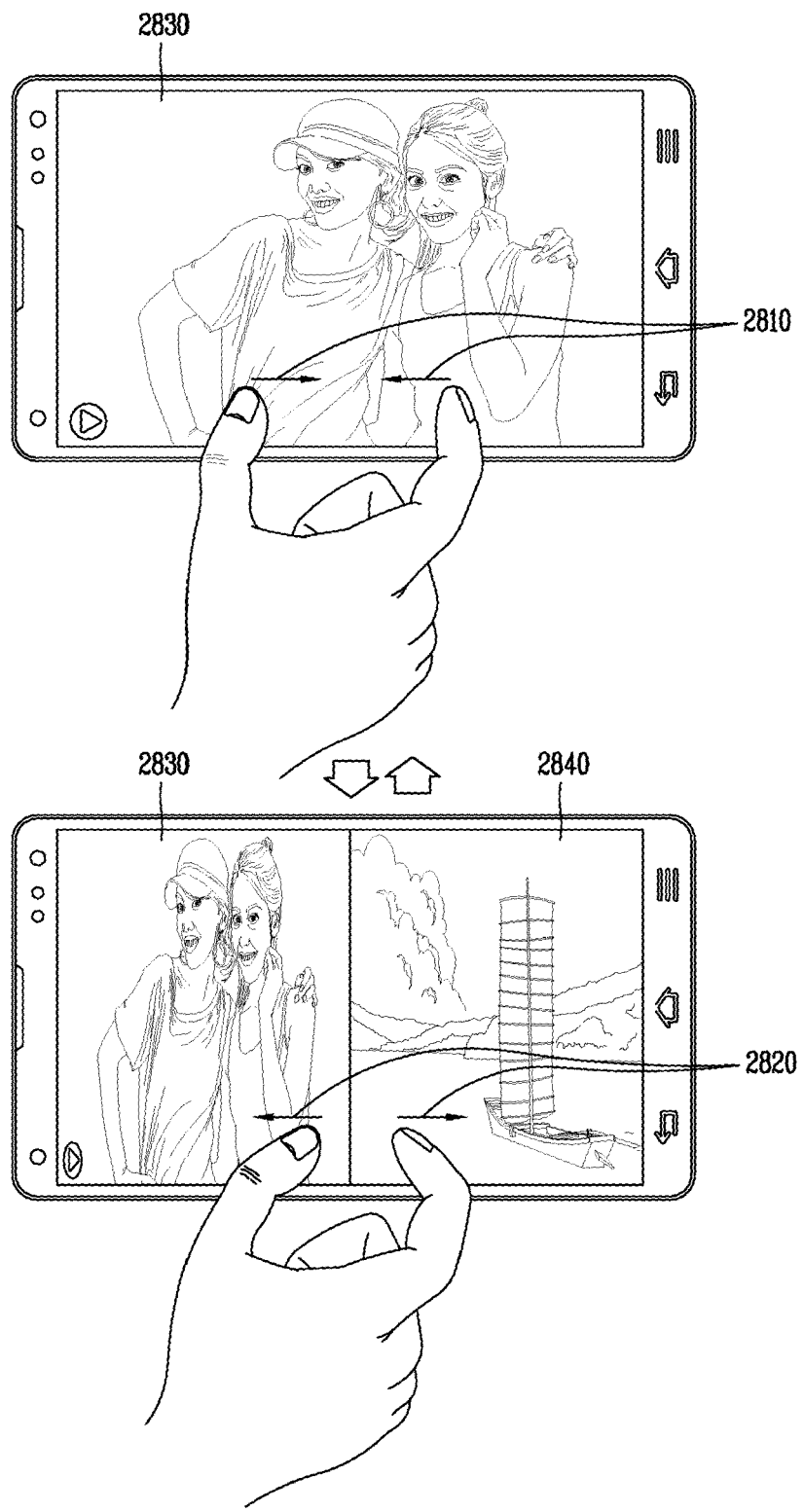

FIGS. 26 through 28 are conceptual views illustrating an embodiment in which a composite image consisting of a plurality of videos is played back. Referring to FIG. 26, a drag input or swipe input 2620 can be applied while a first video constituting a composite image is played back (2610) on the entire screen.

Accordingly, a second video, which is another video constituting a composite image, can be played back (2640) in a separate one region. At this time, a thumbnail 2650 of the first video being played back on the entire screen can be displayed on the time line. Furthermore, the second video being played back (2640) in a separate one region from the first video being played back (2610) on the entire screen can be a video captured at the same time.

Subsequently, when a touch input is applied to a separate one region in which the second video is being played back (2640), the second video can be played back (2630) on the entire screen, and the first video can be played back (2660) in a separate one region. At this time, a thumbnail 2670 of the second video being played back on the entire screen can be displayed on the time line.

In another embodiment, referring to FIG. 27, as illustrated in FIG. 26, a drag input or swipe input 2700 can be applied while the first video constituting a composite image is being played back (2610) on the entire screen. Accordingly, the second video, which is another video constituting a composite image, can be played back (2630) on the entire screen.

In another embodiment, referring to FIG. 28, a pinch-in input 2810 can be applied while a first video 2830 constituting a composite image is being played back on the entire screen. Accordingly, the entire screen can be divided into regions, and videos constituting a composite image can be played back in the divided regions, respectively. In other words, a first video 2830 and a second video 2840 constituting a composite image can be played back in the divided regions, respectively. Subsequently, when a pinch-out input 2820 is applied, it may return again to an initial state. In other words, only the first video 2830 can be played back on the entire screen.

The effects of a mobile terminal according to the present disclosure and a control method thereof will be described as follows. Embodiments of the present disclosure have an advantage of capturing at the same time with multi-camera lenses, and providing an image combination mode according to various visual effects.

Furthermore, embodiments have an advantage of automatically capturing meaningful photos and videos without editing using a situational awareness sensor. In addition, the present disclosure has an advantage of more specifically displaying only a portion associated with a specific subject such as a moving object or the like.

The foregoing present invention can be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a wireless communication processor configured to provide wireless communication;
a display;
a first camera configured to capture a still image and a second camera configured to capture a video image at overlapping capturing times in a preset simultaneous shooting mode; and
a controller configured to:
in response to a preset user input, generate a composite image including the still image captured by the first camera and the video image captured by the second camera, and display the composite image on the display,
wherein when the video image includes a plurality of objects, the controller is further configured to display a portion of the video image that a first object is a main subject on a separate window when a touch input is applied to a first focus region including the first object among the plurality of objects of the video image.

2. The mobile terminal of claim 1, wherein the controller is further configured to display a first preview image corresponding to the still image and a second preview image corresponding to the video image in an overlapping manner on the display.

3. The mobile terminal of claim 2, wherein the controller is further configured to display a graphic object for setting a transparency of the first and second preview images on the display.

4. The mobile terminal of claim 2, wherein the controller is further configured to display the first preview image corresponding to the still image in full screen and the second preview image corresponding to the video image as a thumbnail on the display.

5. The mobile terminal of claim 4, wherein the controller is further configured to change locations of the first and second preview images on the display in response to a specific user input.

6. The mobile terminal of claim 1, wherein the controller is further configured to capture the still image using the first camera, and the video using the second camera in response to a preset condition in the simultaneous shooting mode.

7. The mobile terminal of claim 2, wherein the controller is further configured to:
set a display size of a first region being displayed with the first preview image and a display size of a second region being displayed with the second preview image in response to a specific user input, and
select the second camera to capture the video image in response to the specific user input increasing the display size of the second region to be larger than the display size of the first region.

8. The mobile terminal of claim 1, wherein the controller is further configured to display still images in the composite image at preset time intervals in response to a specific user input.

9. The mobile terminal of claim 1, wherein the controller is further configured to display only the still image or the video image in response to a specific user input when the composite image is being displayed.

10. The mobile terminal of claim 1, wherein the controller is further configured to display the video image included in the composite image in response to a specific user input when the still image included in the composite image in the simultaneous shooting mode is being displayed.

11. The mobile terminal of claim 10, wherein the controller is further configured to play the video image in a forward or reverse direction in response to a preset user input when the video image included in the composite image is being displayed.

12. The mobile terminal of claim 1, wherein when the video image includes a plurality of objects, the controller is further configured to display the still image or play a video image that includes a user selected object among the plurality of objects.

13. The mobile terminal of claim 1, wherein the controller is further configured to:
consecutively capture a plurality of still images by the first camera in response to a specific user input in the simultaneous shooting mode,
generate another composite image including the consecutively captured still images, and
display the another composite image on the display.

14. The mobile terminal of claim 13, wherein the controller is further configured to display the consecutively captured still images in a capture sequence based on a preset user input applied to the composite image.

15. The mobile terminal of claim 14, wherein the controller is further configured to display the consecutively captured still images in a reverse order to the capture sequence based on another user input applied to the composite image.

16. A method of controlling a mobile terminal, the method comprising:
capturing, via a first camera of the mobile terminal, a still image and capturing, via a second camera of the mobile terminal, a video image at overlapping capturing times in a preset simultaneous shooting mode;
in response to a preset user input, generating, via a controller of the mobile terminal, a composite image including the still image captured by the first camera and the video image captured by the second camera; and
displaying the composite image on a display of the mobile terminal,
wherein when the video image includes a plurality of objects, the method further comprises displaying a portion of the video image that a first object is a main subject on a separate window when a touch input is applied to a first focus region including the first object among the plurality of objects of the video image.

17. The method of claim 16, further comprising:
displaying a first preview image corresponding to the still image and a second preview image corresponding to the video image in an overlapping manner on the display.

18. The method of claim 17, further comprising:
displaying a graphic object for setting a transparency of the first and second preview images on the display.

* * * * *